(12) United States Patent
Hensleigh et al.

(10) Patent No.: US 11,999,097 B2
(45) Date of Patent: Jun. 4, 2024

(54) SELECTIVE DEPOSITION OF MATERIALS FOR COMPOSITE STRUCTURES VIA ADDITIVE MANUFACTURING

(71) Applicant: VIRGINIA POLYTECHNIC INSTITUTE AND STATE UNIVERSITY, Blacksburg, VA (US)

(72) Inventors: Ryan Hensleigh, Blacksburg, VA (US); Xiaoyu Zheng, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 312 days.

(21) Appl. No.: 17/057,568

(22) PCT Filed: May 21, 2019

(86) PCT No.: PCT/US2019/033385
§ 371 (c)(1),
(2) Date: Nov. 20, 2020

(87) PCT Pub. No.: WO2019/226695
PCT Pub. Date: Nov. 28, 2019

(65) Prior Publication Data
US 2021/0197446 A1 Jul. 1, 2021

Related U.S. Application Data

(60) Provisional application No. 62/674,563, filed on May 21, 2018.

(51) Int. Cl.
*B29C 64/124* (2017.01)
*B29C 64/30* (2017.01)
(Continued)

(52) U.S. Cl.
CPC ............ *B29C 64/124* (2017.08); *B29C 64/30* (2017.08); *B33Y 10/00* (2014.12); *B33Y 40/20* (2020.01);
(Continued)

(58) Field of Classification Search
CPC ....... B29C 64/124; B29C 64/30; B33Y 40/20; B33Y 70/00
See application file for complete search history.

(56) References Cited

U.S. PATENT DOCUMENTS 4,952,293 A * 8/1990 Sypula ................. C25D 1/18
204/479
7,309,728 B2 12/2007 Kasperchik
(Continued)

FOREIGN PATENT DOCUMENTS

WO 2015095617 A1 6/2015
WO 2018013829 A1 1/2018

OTHER PUBLICATIONS

"International Search Report and Written Opinion", issued by The United States Patent and Trademark Office as International Searching Authority for PCT/US2019/033385 dated Aug. 2, 2019.
(Continued)

*Primary Examiner* — Nahida Sultana
(74) *Attorney, Agent, or Firm* — Carin R. Miller, Esq.; Johnson, Marcou, Isaacs & Nix, LLC

(57) ABSTRACT

Described herein are electroless material deposition methods and techniques that can be used to deposit one or more materials on a structure in a selective manner such that deposition can occur in predetermined areas. The methods and techniques of selective electroless material deposition methods described herein can be used to selectively deposit material(s) on 3D printed structures. In some aspects, the 3D structures can contain micro-features that can have one or more materials selectively deposited on their surface in one or more locations.

20 Claims, 10 Drawing Sheets

(51) Int. Cl.
  *B29K 105/00* (2006.01)
  *B33Y 10/00* (2015.01)
  *B33Y 40/20* (2020.01)
  *B33Y 70/00* (2020.01)

(52) U.S. Cl.
  CPC ...... *B33Y 70/00* (2014.12); *B29K 2105/0014* (2013.01)

(56) References Cited

U.S. PATENT DOCUMENTS

| | | | |
|---|---|---|---|
| 7,790,061 B2* | 9/2010 | Gratson | C09D 11/03 |
| | | | 252/500 |
| 9,227,366 B2* | 1/2016 | Giller | B29C 64/118 |
| 9,353,284 B2 | 5/2016 | Moussa | |
| 2007/0096355 A1 | 5/2007 | Yashiro et al. | |
| 2011/0313142 A1* | 12/2011 | Corma Canos | C07D 213/74 |
| | | | 534/587 |
| 2012/0092632 A1 | 4/2012 | McLeod et al. | |
| 2016/0161872 A1* | 6/2016 | Orrock | G03G 15/225 |
| | | | 264/484 |
| 2021/0197446 A1* | 7/2021 | Hensleigh | B29C 64/30 |

OTHER PUBLICATIONS

Ligon et al. 2017, "Polymers for 3D Printing and Customized Additive Manufacturing" Chem. Rev. 10212-10281.

Cui et al. "Three-dimensional printing of piezoelectric materials with designed anisotropy and directional response" (2019) Nature Materials. 18:234-241.

Zheng et al. Multiscale Metallic Metamaterials. Nat. Mater. 2016, 15(10), 1100-1106.

Zheng et al. Ultralight, Ultrastiff Mechanical Metamaterials. Science. 2014, 344 (6190), 1373-1377.

Yu et al. Polymer-Assisted Metal Deposition (PAMD): A Full-Solution Strategy for Flexible, Stretchable, Compressible, and Wearable Meta Conductors. Adv. Mater. 2014, 26 (31), 5508-5516.

Takeyasu et al. Fabrication of 3D Metal/Polymer Fine Structures for 3D Plasmonic Metamaterials. In Photonic Metamaterials: From Random to Periodic (2007), paper WD3: Optical Society of America, 2007; pWD3.

Takeyasu et al. Fabrication of 3D Metal/Polymer Microstructures by Site-Selective Metal Coating. Appl. Phys. A 2008. 90(2), 205-209.

Farrer et al. Selective functionalization of 3-D Polymer Microstructures. J. Am. Chem. Soc. 2006, 128 (6), 1796-1797.

Shah et al. Synthesis of Carbon Nanotubes by Catalytic Chemical Vapour Deposition: A Review on Carbon Sources, Catalysts and Substrates. Materials Science in Semiconductor Processing 2016, 41, 67-82.

Rashid et al. Catalyst Role in Chemical Vapor Deposition (CVD) Process: A Review. Rev. Adv. Mater. Sci. 2015, 40 (3), 235-248.

Paripovic et al. Polymer Brush Guided Formation of Thin Gold and Palladium/Gold Bimetallic Films. ACS Appl. Mater. Interfaces 2011, 3(3), 910-917.

Angel et al., Selective Electroplating of 3D Printed Parts, Additive Manufacturing, 20, 164-172, 2018.

Patel et al. Highly Stretchable and UV Curable Elastomers for Digital Light Processing Based 3D Printing. Adv. Mater. 2017.

Ahn et al. Omnidirectional Printing of Flexible, Stretchable, and Spanning Silver microelectrodes. Science. 2009. 323 (5921), 1590-1593.

Soukoulis et al. Achievements and Future Challenges in the Development of Three-Dimensional Photonic Metamaterials. Nat. Photon 2011, 5(9), 523-530.

Zheludev and Plum. Reconfigurable Nanomechanical Photonic Metamaterials. 2016, 11 (1), 16-22.

Liu et al. Three-Dimensional Photonic Metamaterials at Optical Frequencies. Nat. Mat. 2008, 7(1), 31-37.

Marx et al., Overview of Composite Metal Foams and Their Properties and Performance, Adv. Eng. Mater. 2017, 13 pages.

Adams et al., Conformal printing of electrically small antennas on three-dimensional surfaces, Adv. Materials. 2011, 23 (11), 1335-1340.

Zhou et al., Gigahertz Electromagnetic Structures via Direct Ink Writing for Radio-Frequency Oscillator and Transmitter Applications, Advanced Materials. 2017, 9 pages.

Lis et al., Polymner Dielectrics for 3D-Printed RF Devices in the Ka band, Adv. Mater. Technol. 2016, 1(2), 6 pages.

* cited by examiner

SELECTIVE DEPOSITION OF MATERIALS FOR COMPOSITE STRUCTURES VIA ADDITIVE MANUFACTURING

CROSS-REFERENCE TO RELATED APPLICATIONS

This application is the U.S. National Stage Application under 35 U.S.C. § 371 of Patent Cooperation Treaty Application No.: PCT/US2019/033385, filed on May 21, 2019, entitled "SELECTIVE DEPOSITION OF MATERIALS FOR COMPOSITE STRUCTURES VIA ADDITIVE MANUFACTURING," which claims the benefit of and priority to U.S. Provisional Patent Application No. 62/674,563, filed on May 21, 2018, entitled "SELECTIVE DEPOSITION OF MATERIALS FOR COMPOSITE STRUCTURES VIA ADDITIVE MANUFACTURING" the contents of which are incorporated by reference herein in their entireties.

TECHNICAL FIELD

The subject matter disclosed herein is generally directed to systems and methods involving metal deposition, and more particularly to systems and methods involving selective deposition of one or more materials within one structure.

BACKGROUND

Creating defined patterns is indispensable to functional devices such as integrated circuits, micro-electro-mechanical systems, antenna, sensors, actuators, and metamaterials. Three-dimensional (3D) printing is a desirable manufacturing method for various functional devices, including those previously mentioned. As such, there exists a need for techniques for generation of discrete and defined features on structures for generation of various functional devices that can be suitable for use with various manufacturing techniques, including 3D printing.

SUMMARY

Described herein are aspects of a method of electroless selective material deposition that can include the steps of: a) forming a multi-material three-dimensional (3D) structure, wherein the multi-material 3D structure is formed with at least two polymers selected from the group consisting of: a negatively charged polymer, a positively charged polymer, and a neutral polymer, so as to form at least two differentially charged regions of the multi-material 3D structure selected from the group of: a negatively charged region, a positively charged region, and a neutral region; b) optionally bringing the multi-material 3D structure to a certain pH to activate or deactivate certain regions to be either neutral, positive, or negatively charged; c) optionally exposing the multi-material 3D structure to a deposition catalyst, wherein the deposition catalyst is positively charged or negatively charged, wherein a positively charged deposition catalyst associates or attaches to negatively charged region(s), wherein a negatively charged deposition catalyst attaches to positively charged region(s), and wherein substantially no deposition catalyst attaches to neutral region(s) present in the multi-material 3D structure; d) exposing the multi-material 3D structure from step c) to a first material to be deposited and allowing autocatalysis, attachment, and/or deposition of the first material on the 3D structure in regions where the deposition catalyst is present or if no catalyst is present to oppositely charged region(s), wherein if the deposition material is positively charged it associates or attaches to the negatively charged region(s), wherein a negatively charged material associates or attaches to positive charged region(s), and wherein substantially no material attaches to neutral region(s) present in the multi-material 3D structure; e) optionally treating the multi-material 3D structure after step d) to remove the deposition catalyst present after step c); f) optionally treating the multi-material 3D structure after step e) to activate regions with no deposition material to become positive, negative, or neutral wherein if this step does not occur there may still be positive, negative or neutrally charged regions in the multi-material 3D structure; g) optionally treating the 3D structure after step f) to coat the previously deposited regions from step d) to become positive, negative or neutral; h) optionally repeating step c); and i) optionally exposing the 3D structure from step h) to a second material to be deposited and allowing autocatalysis, attachment, and/or deposition of the second material on the 3D structure in regions where the deposition catalyst is present or if no catalyst is present to oppositely charged region(s), wherein if the deposition material is positively charged it associates or attaches to the negatively charged region(s), wherein a negatively charged material associates or attaches to positive charged region(s), and wherein substantially no material attaches to neutral region(s) present in the 3D structure; j) optionally repeating steps e) through i) to build multiple layers upon previously deposited layers until a desired number of deposited layers is reached; and k) optionally using direct or contactless electrochemical methods to deposit or remove materials on electrically independent areas. In aspects, the step of forming the multi-material 3D structure includes forming the multi-material 3D structure using a multi-material additive manufacturing process. In aspects, the multi-material additive manufacturing is a light-based multi-material additive manufacturing process. In aspects, the multi-material 3D structure has micro-scale features. In aspects, the negatively charged polymer is selected from the group of: polyacrylic acids (polyacrylates), polyacrylamides, siloxanes, polysulfonates, polyvinyls, polyphosphates, and combinations thereof. In aspects, the negatively charged polymer includes one or more ionic groups, where each of the one or more anionic groups can each be individually selected from the group of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof. In aspects, the positively charged polymer is selected from the group of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof. In aspects, the positively charged polymer has one or more cationic groups, wherein each of the one or more cationic groups can be individually selected from the group of: an amide, an amine, an imine, an imide, an azide group, phosphonium group, and combinations thereof. In aspects, the neutral polymer is selected from the group of: polyethylenes, polyacrylates, polyacrylamides, polyvinyls, polyethers, siloxanes, urethanes and combinations thereof. In aspects, the deposition catalyst is a positively or negatively charged ion of a metal selected from the group of: Pd, Pt, Ru, Ni, Co, Cu, Zn, Cr, Fe, Pb, Sn, Ag, Hg, Mn, and combinations thereof.

Also described herein are aspects of a method of electroless selective material deposition that can include the steps of a) exposing the multi-material 3D structure to a deposition catalyst, wherein the deposition catalyst is positively charged or negatively charged, wherein the multi-material 3D structure is formed with at least two polymers selected from the group of: a negatively charged polymer, a positively charged polymer, and a neutral polymer, so as to form at least two differentially charged regions of the multi-material 3D structure selected from the group of: a negatively charged region, a positively charged region, and a neutral region, wherein a positively charged deposition catalyst associates or attaches to negatively charged region(s), wherein a negatively charged deposition catalyst attaches to positively charged region(s), and wherein substantially no deposition catalyst attaches to neutral region(s) present in the 3D structure; b) exposing the multi-material 3D structure from step a) to a first material to be deposited and allowing autocatalysis, attachment, and/or deposition of the first material on the 3D structure in regions where the deposition catalyst is present c) washing the 3D structure after step b) to remove the deposition catalyst present after step c); d) optionally repeating step a) wherein the charge of the deposition catalyst is opposite from that of the catalyst used in step b); and e) optionally exposing the 3D structure from step d) to a second material to be deposited and allowing autocatalysis, attachment, and/or deposition of the second material on the 3D structure in regions where the deposition catalyst is present. In aspects, the multi-material 3D structure is formed using a multi-material additive manufacturing process. In aspects, the multi-material additive manufacturing is a light-based multi-material additive manufacturing process. In aspects, the multi-material 3D structure has micro-scale features. In aspects, the negatively charged polymer is selected from the group of: polyacrylic acids (polyacrylates), polyacrylamides, siloxanes, polysulfonates, polyvinyls, polyphosphates, and combinations thereof. In aspects, the negatively charged polymer includes one or more ionic groups, where each of the one or more anionic groups can each be individually selected from the group of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof. In aspects, the positively charged polymer is selected from the group of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof. In aspects, the positively charged polymer has one or more cationic groups, wherein each of the one or more cationic groups can be individually selected from the group of: an amide, an amine, an imine, an imide, an azide group, phosphonium group, and combinations thereof. In aspects, the neutral polymer is selected from the group of: polyethylenes, polyacrylates, polyacrylamides, polyvinyls, polyethers, siloxanes, urethanes and combinations thereof. In aspects, the deposition catalyst is a positively or negatively charged ion of a metal selected from the group of: Pd, Pt, Ru, Ni, Co, Cu, Zn, Cr, Fe, Pb, Sn, Ag, Hg, Mn, and combinations thereof. In aspects, the method can include the step of forming a multi-material three-dimensional (3D) structure, wherein the multi-material 3D structure is formed with at least two polymers selected from the group of: a negatively charged polymer, a positively charged polymer, and a neutral polymer, so as to form at least two differentially charged regions of the multi-material 3D structure selected from the group of: a negatively charged region, a positively charged region, and a neutral region before step b).

Also described herein are 3D structures produced by any of the methods described herein.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 6A shows a schematic demonstrating a charge mosaic that can be formed that combines positive, negative, and neutral areas and can represent a patterned substrate upon which selective electroless deposition of materials can be completed by exploitation of the charge difference between each differentially charged region. FIGS. 6B-6D shows an images of a 3D structures having microfeatures that contains multiple materials (e.g. Ni—P or Cu) selectively deposited on its surface and that was generated by aspects of the method described herein using Pd ions as a catalyst. FIG. 6E is a microscopic image that demonstrates the resolution of the 3D printing and/or deposition technique described herein is approximately 10 microns.

FIG. 7A shows images and graphs that demonstrate Ni—P and Cu metal/dielectric combination of materials and their functionality. FIG. 7B shows images and graphs that demonstrate bimetallic Cu and Ni—P octet-truss unit cell according to aspects of the method described herein.

DETAILED DESCRIPTION

Figure 1:
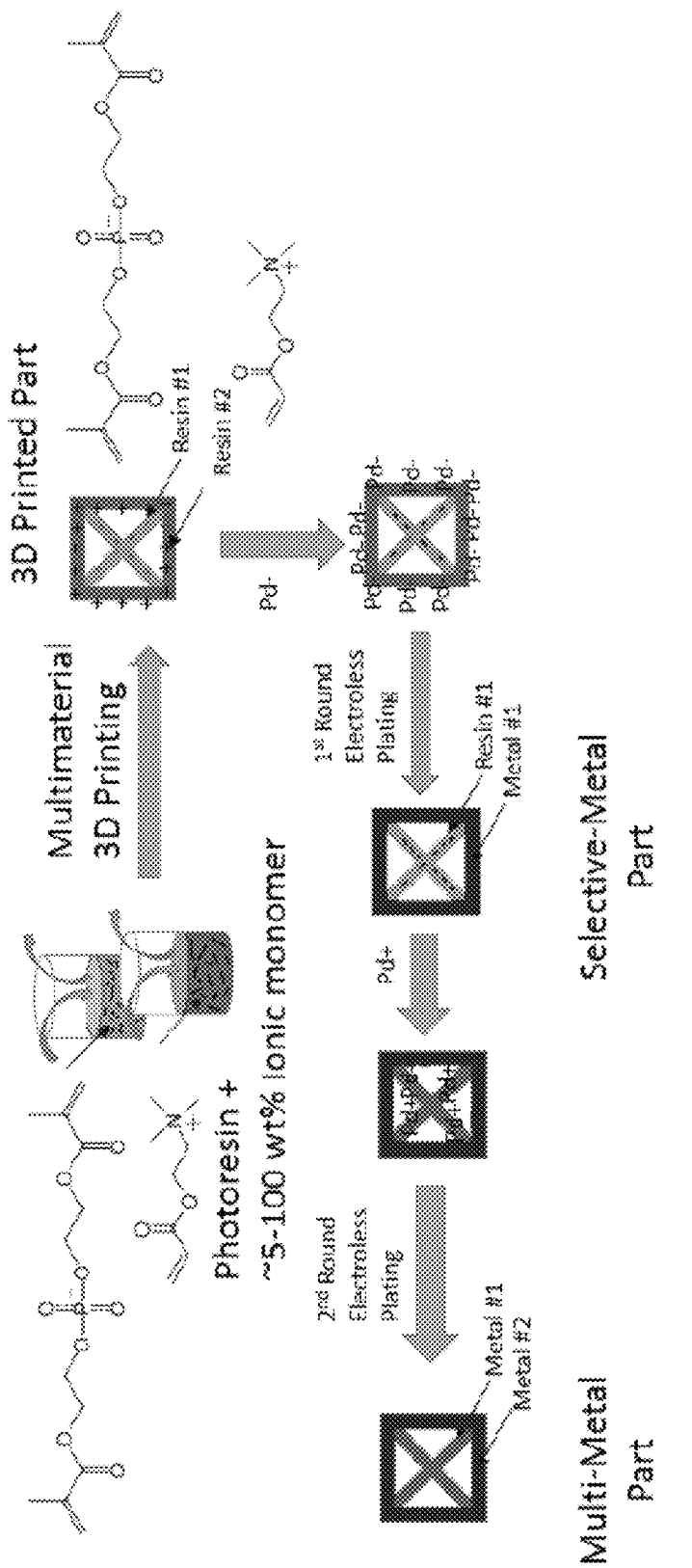
FIG. 1 shows a general overview of a method of electroless selective deposition as described herein.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used in the specification and the appended claims, the singular forms "a," "an," and "the" include plural referents unless the context clearly dictates otherwise.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Embodiments of the present disclosure will employ, unless otherwise indicated, techniques of three-dimensional printing, organic chemistry, biochemistry, engineering, and the like, which are within the skill of the art. Such techniques are explained fully in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible unless the context clearly dictates otherwise.

Definitions

As used herein, "amino" and "amine," are art-recognized and refer to both substituted and unsubstituted amines, e.g., a moiety that can be represented by the general formula:

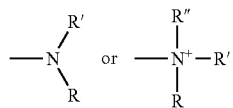

wherein, R, R', and R" each independently represent a hydrogen, substituted or unsubstituted alkyl, substituted or unsubstituted alkenyl, substituted or unsubstituted alkynyl, substituted or unsubstituted carbonyl, —$(CH_2)_m$—R''', or R and R' taken together with the N atom to which they are attached complete a heterocycle having from 3 to 14 atoms in the ring structure; R''' represents a hydroxy group, substituted or unsubstituted carbonyl group, an aryl, a cycloalkyl ring, a cycloalkenyl ring, a heterocycle, or a polycycle; and m is zero or an integer ranging from 1 to 8. In preferred embodiments, only one of R and R' can be a carbonyl, e.g., R and R' together with the nitrogen do not form an imide. In preferred embodiments, R and R' (and optionally R") each independently represent a hydrogen atom, substituted or unsubstituted alkyl, a substituted or unsubstituted alkenyl, or —$(CH_2)_m$—R'''. Thus, the term 'alkylamine' as used herein refers to an amine group, as defined above, having a substituted or unsubstituted alkyl attached thereto (i.e. at least one of R, R', or R" is an alkyl group).

As used herein, "attached" can refer to covalent or non-covalent interaction between two or more molecules. Non-covalent interactions can include ionic bonds, electrostatic interactions, van der Walls forces, dipole-dipole interactions, dipole-induced-dipole interactions, London dispersion forces, hydrogen bonding, halogen bonding, electromagnetic interactions, π-π interactions, cation-π interactions, anion-π interactions, polar π-interactions, and hydrophobic effects.

The term of art "block copolymer" refers to a copolymer having an arrangement of blocks that are linked via covalent bonds, where each type of block are chemically distinct polymers that form the repeat units of the block copolymer. "Block copolymers" can self-assemble from the constituent blocks. "Block copolymers" can have many topologies. For example, a "block copolymer" can be diblock (e.g. AB or BA), triblock (e.g. ABA, BAB). Block copolymers can be linear or branched. "Block copolymers" can be segmented (e.g. those composed of many alternating small blocks of two or more different types of repeating unit), graft, comb, or brush (e.g. those composed of one long main chain of one repeating unit and several smaller blocks of a second repeating unit branching off of the polymer backbone), or radial or star (e.g. those composed of several arms branching from a central attachment point each terminated with an end-block).

As used herein, copolymer generally refers to a single polymeric material that is composed of two or more different monomers. The copolymer can be of any form, such as random, block, graft, etc. The copolymers can have any end-group, including capped or acid end groups. Copolymers include, but are not necessarily limited to, those including 1, 2, 3, 4, or more different monomers.

As used herein, "derivative" can refer to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include prodrugs, or metabolites of the parent compound. Derivatives include compounds in which free amino groups in the parent compound have been derivatized to form amine hydrochlorides, p-toluene sulfonamides, benzoxycarboamides, t-butyloxycarboamides, thiourethane-type derivatives, trifluoroacetylamides, chloroacetylamides, or formamides. Derivatives include compounds in which carboxyl groups in the parent compound have been derivatized to form methyl and ethyl esters, or other types of esters or hydrazides. Derivatives include compounds in which hydroxyl groups in the parent compound have been derivatized to form O-acyl or O-alkyl derivatives. Derivatives include compounds in which a hydrogen bond donating group in the parent compound is replaced with another hydrogen bond donating group such as OH, NH, or SH. Derivatives include replacing a hydrogen bond acceptor group in the parent compound with another hydrogen bond acceptor group such as esters, ethers, ketones, carbonates, tertiary amines, imine, thiones, sulfones, tertiary amides, and sulfides. "Derivatives" also includes extensions of the replacement of the cyclopentane ring with saturated or unsaturated cyclohexane or other more complex, e.g., nitrogen-containing rings, and extensions of these rings with side various groups.

The term "molecular weight", as used herein, can generally refer to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

As used herein, the terms "optional" or "optionally" means that the subsequently described event or circumstance can or cannot occur, and that the description includes instances where said event or circumstance occurs and instances where it does not.

As used herein, "polymer" refers to molecules made up of monomers repeat units linked together. "Polymers" are understood to include, but are not limited to, homopolymers, copolymers, such as for example, block, graft, random and alternating copolymers, terpolymers, etc. and blends and modifications thereof. "A polymer" can be can be a three-dimensional network (e.g. the repeat units are linked together left and right, front and back, up and down), a two-dimensional network (e.g. the repeat units are linked together left, right, up, and down in a sheet form), or a one-dimensional network (e.g. the repeat units are linked left and right to form a chain). "Polymers" can be composed, natural monomers or synthetic monomers and combinations thereof. The polymers can be biologic (e.g. the monomers are biologically important (e.g. an amino acid), natural, or synthetic.

As used herein, "reactive side chain" refers to the pendant group of a monomer or monomeric unit within a polymer, which contains an organic functional group that reacts with another organic functional group to form a covalent bond.

As used herein, "surface," in the context herein, refers to a boundary of a product. The surface can be an interior surface (e.g. the interior boundary of a hollow product), or an exterior or outer boundary or a product. Generally, the surface of a product corresponds to the idealized surface of a three dimensional solid that is topological homeomorphic with the product. The surface can be an exterior surface or an interior surface. An exterior surface forms the outermost layer of a product or device. An interior surface surrounds an inner cavity of a product or device, such as the inner cavity of a tube. As an example, both the outside surface of a tube and the inside surface of a tube are part of the surface of the tube. However, internal surfaces of the product that are not in topological communication with the exterior surface, such as a tube with closed ends, can be excluded as the surface of a product. In some embodiments, an exterior surface of the product is chemically modified, e.g., a surface that can contact an immune system component. In some embodiments, where the product is porous or has holes in its mean (idealized or surface), the internal faces of passages and holes are not considered part of the surface of the product if its opening on the mean surface of the product is less than 1 µm.

As used herein, "substantial" and "substantially," specify an amount of between 95% and 100%, inclusive, between 96% and 100%, inclusive, between 97% and 100%, inclusive, between 98% and 100%, inclusive, or between 99% 100%, inclusive.

As used herein, "substantially free" can mean an object species is present at non-detectable or trace levels so as not to interfere with the properties of a composition or process.

As used herein, "substituted," refers to all permissible substituents of the compounds or functional groups described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups. Such alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups can be further substituted. "Substituted," as used herein, refers to all permissible substituents of the compounds or functional groups described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups. Such alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups can be further substituted.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

As used herein, "microfeature" refers to a physical feature or aspect of a structure that is something smaller than the entire structure whose largest dimension is a micron or less.

Discussion

Creating defined patterns is indispensable to functional devices such as integrated circuits, micro-electro-mechanical systems, antenna, sensors, actuators, and metamaterials. Microfabrication process based on traditional lithography, deposition, etching, and release, are well suited to create planar, two-dimensional (2D) patterned devices built from similarly flat substrates. However, this 2D design constraint has largely persisted despite the desire to create isotropic, structural, or conformable 3-dimensional (3D) devices with arbitrary layout. Complex, non-planar 3D substrates preclude post-processing by traditional lithographic and extrusion/spray methods due to shadowing/blockage of internal areas by external substrate features i.e. beams, walls, etc. of the 3D structure. 2D lithography in combination with strain to deform planar patterns into 3D structures has been used to make functional devices, but these are ultimately limited in resolution, complexity, and periodicity.

3D printing can access essentially any arbitrarily complex structure, but is limited mostly to non-functional, structural materials due to the trade-off between ease-of-processing and functionality. Significant time is spent optimizing the processing of each individual material to be compatible for the chosen 3D printing technique. Most previously demonstrated 3D printed devices, largely require so called multi-process techniques, combining multiple printing, infilling, wire embedding etc., procedures to form a functional device. The extensive use of print pausing, switching between techniques, and subsequent layer alignment, is a major bottleneck for layer-by-layer techniques, leading to excessive build time and requiring extensive optimization, limiting broad applicability. To move beyond this paradigm, what is needed is a method to 3D print with only a few optimized materials, from which a variety of materials, metal, ceramic, colloids, etc., can be deposited at pre-defined locations within the 3D structure.

With that said, described herein compositions, systems, and processes for selective deposition of multi-materials capable of forming multi-material composite structures having a complex 3D architecture. In some aspects, a multi-material composite structure can be generated by 3D printing a structure with at least two differentially charged polymer resins selected from the group of: a positively charged polymer resin, a negatively charged polymer resin, and a neutral polymer resin, and depositing positively and/or negatively charged metals on the 3D printed polymer structure, where the positively charged metals can be selectively deposited on regions formed from the negatively charged resin, where the negatively charged metals can be selectively deposited on regions formed from the positively charged resin, and where substantially no metals are deposited on the regions formed from the neutral resin. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Electroless Selective Material Deposition

Described herein are aspects of a method of electroless selective material deposition on a three-dimensional (3D) structure. In some aspects, the 3D structure can have microscale features. In aspects, the 3D structure has at least one region that is charged (either positively or negatively). The 3D structure can optionally have one or more regions that are neutral in charge. In aspects, the 3D structure can be formed from multiple materials. In aspects, the 3D structure has at least two regions selected from the group of: a positively charged region, a negatively charged region and a neutral region. In aspects, the 3D structure can be formed from multiple polymer materials that are differentially charged. The 3D structure can have one or more positively charged regions, where the positively charged regions are formed from positively charged polymers. The 3D structure can have one or more negatively charged regions, wherein the negatively charged regions are formed from negatively charged polymers. The 3D structure can have one or more neutral regions, wherein the neutral regions are formed from neutrally charged polymers.

One or more materials can be selectively deposited on the 3D structure. In aspects, the material(s) to be deposited. One or more materials can be exposed to a primed 3D structure, which contains one or more charged (positively and/or negatively charged) regions that are primed with a deposition catalyst having an opposite charge as the region to which they associate. Materials will be deposited in regions where the deposition catalyst is present, thus leading to selective deposition of materials. Substantially no charged materials will attach to neutral region(s) present in the 3D structure because no (or substantially no) deposition catalyst will be present. Attachment and deposition of the materials occurs via autocatalysis where the material comes in contact with the deposition catalyst present on the 3D structure. Suitable deposition catalysts include metal ions (positively or negatively charged). In aspects the deposition catalyst is Pd, Pt, Ru, Ni, Co, Cu, Zn, Cr, Fe, Pb, Sn, Ag, Hg, Mn, or a combination thereof.

Exposure of the 3D structure to the deposition catalyst can occur a temperature ranging from about 15 degrees C. to about 200 degrees C. In some aspects, exposure of the 3D structure to the deposition catalyst can occur at about room temperature (about 20-25 degrees C.). Exposure of the 3D structure to the deposition catalysis can occur for about 10 seconds to about 1 min, 2 min, 3 min, 4 min, 5 min, 6 min, 7 min, 8 min, 9 min, 10 min, 11 min, 12 min, 13 min, 14 min, 15 min, 16 min, 17 min, 18 min, 19 min, 20 min, 21 min, 22 min, 23 min, 24 min, 25 min, 26 min, 27 min, 28 min, 29 min, 30 min, 31 min, 32 min, 33 min, 34 min, 35 min, 36 min, 37 min, 38 min, 39 min, 40 min, 41 min, 42 min, 43 min, 44 min, 45 min, 46 min, 47 min, 48 min, 49 min, 50 min, 51 min, 52 min, 53 min, 54 min, 55 min, 56 min, 57 min, 58 min, 59 min, 60 min, 61 min, 62 min, 63 min, 64 min, 65 min, 66 min, 67 min, 68 min, 69 min, 70 min, 71 min, 72 min, 73 min, 74 min, 75 min, 76 min, 77 min, 78 min, 79 min, 80 min, 81 min, 82 min, 83 min, 84 min, 85 min, 86 min, 87 min, 88 min, 89 min, 90 min, 91 min, 92 min, 93 min, 94 min, 95 min, 96 min, 97 min, 98 min, 99 min, 100 min, 101 min, 102 min, 103 min, 104 min, 105 min, 106 min, 107 min, 108 min, 109 min, 110 min, 111 min, 112 min, 113 min, 114 min, 115 min, 116 min, 117 min, 118 min, 119 min, or 120 min. Exposure of the 3D structure to the material to be deposited and/or autocatalysis can occur a temperature ranging from about 15 degrees C. to about 200 degrees C. In some aspects, exposure of the 3D structure to the material to be deposited and/or autocatalysis can occur at about room temperature (about 20-25 degrees C.). Exposure of the 3D structure to the material to be deposited and/or autocatalysis can occur for about 10 seconds to about 1 min, 2 min, 3 min, 4 min, 5 min, 6 min, 7 min, 8 min, 9 min, 10 min, 11 min, 12 min, 13 min, 14 min, 15 min, 16 min, 17 min, 18 min, 19 min, 20 min, 21 min, 22 min, 23 min, 24 min, 25 min, 26 min, 27 min, 28 min, 29 min, 30 min, 31 min, 32 min, 33 min, 34 min, 35 min, 36 min, 37 min, 38 min, 39 min, 40 min, 41 min, 42 min, 43 min, 44 min, 45 min, 46 min, 47 min, 48 min, 49 min, 50 min, 51 min, 52 min, 53 min, 54 min, 55 min, 56 min, 57 min, 58 min, 59 min, 60 min, 61 min, 62 min, 63 min, 64 min, 65 min, 66 min, 67 min, 68 min, 69 min, 70 min, 71 min, 72 min, 73 min, 74 min, 75 min, 76 min, 77 min, 78 min, 79 min, 80 min, 81 min, 82 min, 83 min, 84 min, 85 min, 86 min, 87 min, 88 min, 89 min, 90 min, 91 min, 92 min, 93 min, 94 min, 95 min, 96 min, 97 min, 98 min, 99 min, 100 min, 101 min, 102 min, 103 min, 104 min, 105 min, 106 min, 107 min, 108 min, 109 min, 110 min, 111 min, 112 min, 113 min, 114 min, 115 min, 116 min, 117 min, 118 min, 119 min, or 120 min.

The number of washing steps between each round of electroless plating can be 1, 2, 3, 4, 5, 6, 7, 8, 9, 10 or more. One or more washing steps between priming the 3D structure with the deposition catalyst and exposing the 3D structure to the material to be dipositive can be optionally included. In some aspects, 1, 2, 3, 4, 5, 6, 7, 8, 9, 10 or more of these optional washing steps can be included.

Attachment and deposition can be completed without the use of an electrical current, as is typically used in plating techniques (e.g. electroplating). This is referred to elsewhere herein as "electroless." In other words, the 3D structure can be plated with multiple materials in specific locations based on surface charges of the 3D structure in an electroless manner. The method can include one or more rounds of deposition, where each round can include exposing a 3D structure to a solution of specific pH to activate/charge certain areas of the structure, a positively or negatively charged deposition catalyst (e.g. $Pd^+$ or $Pd^-$), exposing the 3D structure having one or more charged area to a material to be deposited, letting the material attach and be deposited to the region of the 3D structure having the deposition catalyst, and optionally performing a washing step to remove excess material and deposition catalyst. Washing can be performed with a suitable solution including deionized water, acid (pH 2-7), base (pH 7-12), or various organic solvents (ethanol, acetone, etc.). Additional aspects of the method will be discussed in further detail elsewhere herein. Deposition may also occur via electroless gaseous methods, such as chemical vapor deposition.

Once a conductive layer has been deposited, electrodeposition, either through forming a conductive link to the previously deposited, conductive material, or through contactless bipolar electrodeposition, can be used to further deposit material which is either the same or different to the previously deposited material. Electroless and electrodeposition can be optionally repeated, from 1 to 50 times, to form a multilayer structure with controlled thickness of each layer from 1 nm to 10 microns. The electrodeposition can be localized to certain areas of previously deposited material which are electrically independent of all other previously deposited areas, so that electrodeposition occurs selectively in that area. Inverse electrodeposition techniques can be applied similarly to electrically independent areas to de-alloy or remove materials which have been previously deposited. These can completely remove previously deposited layers or remove only certain elements within previously deposited layers to create a porous structure from 1-99% porosity.

A surface treatment may be applied to selectively deposited materials which includes organic, polymeric, or inorganic materials. These material may self-assemble on the surface of previously deposited layers by exposing the previously deposited layers to these materials. They may be grown by polymerization techniques from the surface. In some cases solvent, heat, or other chemical treatment will be needed to fully bond these material to previous layers or to grow them from the surface. These layers can be selective for only certain materials i.e. metal and not ceramic. These layers can have positive, negative or neutral charge, and can be used to selectively deposit materials by similar techniques described herein. They can optionally prevent the deposition of materials on previously deposited layers. They can act as dielectric materials. They can be removed by certain chemical techniques, thermal treatment, or applying electrical current to a previously deposited substrate they are attached to. Multiple types of material may be combined which can simultaneously self-assemble on previously deposited substrate. They may form a pattern on this previously deposited substrate by chemical, electrical, magnetic, thermal, solvent, or other interactions. This pattern may be used to selectively deposit material in a replicating pattern on the previously deposited material.

Suitable materials that can be selectively deposited on a 3D structure as described herein can include, but are not limited to, metals, ceramics, colloids, chalcogenides, organics, polymers, and combination thereof. In some aspects, one or more of the materials that can be selectively deposited can be piezoelectric, semiconductive, conductive magnetic, thermoresponsive, thermoelectric, and combinations thereof or otherwise functional. In some aspects, the metal(s) deposited can each be independently selected from the group of: Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Ce, Pr, Nd, Pm, Sm, Eu, Gd, Tb, Dy, Ho, Er, Rm, Yb, Lu, Hf, W, Re, Os, Ir, Pt, Au, Hg, Tl, Pb, Bi, Po, Ra, Ac, Th, Pa, U, Np, Am, Cm, Bk, Cf, Es, Fm, Md, No, Lr, Rf, Db, Sg, Bh, Hs, Mt, Ds, Rg, Cn, Nh, Fl, Mc, Lv, oxides thereof, alloys thereof, and combinations thereof.

In some aspects, the 3D structure can be formed using an additive manufacturing process. Any suitable multi-material additive manufacturing process can be used to form the 3D structure ranging from fused deposition modeling (FDM) also known as fused filament fabrication (FFF), to light-based additive manufacturing processes. In some aspects, the additive manufacturing process is a light-based additive manufacturing process. Light-based additive manufacturing processes are those that form solid forms by polymers from their respective constituent units (monomers or polymers) using light energy. The constituent units can be photomonomers and/or photopolymers, which are monomers and polymers that are light-reactive or light-activated (e.g. they can polymerize upon being contacted with light).

FFF based techniques generally rely on extruding feedstock filaments composed from printhead nozzles, heating the feedstock filaments to facilitate deposition of the material into layers, depositing the melted filaments into layers to form the 3D object, and allowing the material to cool and harden to form the 3D object. Many variations of FFF techniques, including multi-material printing techniques, are known in the art. See e.g. Ligon et al. 2017 ("Polymers for 3D Printing and Customized Additive Manufacturing" Chem. Rev. 10212-10281). Light-based additive manufacturing techniques can fall into various categories of additive manufacturing types. Suitable light-based additive manufacturing techniques can include, but are not limited to, selective laser sintering (SLS), Vat-photopolymerization processes (e.g. stereolithography (SLA) and digital light processing techniques (DLP)), and material jetting. In Vat-polymerization processes, the 3D object is built up on a build platform that is submerged in a vat of liquid, unpolymerized resin. Light is projected into the resin where the next layer of the 3D object is to be formed and cures the resin in that area to form the layer. The process is repeated as necessary to form the object. There are many variations on Vat-polymerization processes including SLA and DLP. SLA forms layers one part of the layer at a time. In typical DLP, unlike SLS, a single flash of projected light is used to create an entire layer at once. In SLS, a laser light is focused on material powder to sinter them and form them into cohesive layers. In material jetting, droplets of liquid resin, plastic, or wax are deposited on a build platform to create layers of an object. Solidification can occur by cooling or by exposure to light. Other suitable 3D printing techniques will be appreciated by one of ordinary skill in the art in view of this disclosure, see e.g. Ligon et al. 2017 ("Polymers for 3D Printing and Customized Additive Manufacturing" Chem. Rev. 10212-10281). One example of a light-based additive manufacturing method that can be used is set forth in Pat. App. Pub. No. WO 2018/013829, which is incorporated by reference as if expressed herein in its entirety. These can be operated in a single or multilateral mode to produce a multi-material 3D structure with one or more charged areas ready for electroless selective material deposition described herein.

As stated above, the 3D structure, which can have one or more positively charged regions, one or more negatively charged regions, and optionally one or more neutral regions. The positively charged regions can be composed of positively charged polymer(s) as previously discussed. The negatively charged regions can be composed of negatively charged polymer(s) as previously discussed. The neutral regions can be composed of neutral polymer(s). The negatively charged and positively charged regions can be either permanently charged, or the charge can be switchable. The charge can be either activated or removed by bringing the regions to a certain pH based on the pKa of the chemical group. At certain pH levels the functional group may also have a partial charge. When these switchable regions have no charge they behave similarly to a neutral polymer as herein described. When charged these switchable regions behave similarly to permanently charged regions, either positive or negative depending on the functional group, described herein. In some aspects, the 3D structure can include a piezoelectric material. In some aspects, the piezoelectric material can be covalently bonded to the polymer or monomeric constituent described elsewhere herein and thus included in the 3D structure. In aspects, the 3D structure can have designed anisotropy and directional response as described in Cui et al. "Three-dimensional printing of piezoelectric materials with designed anisotropy and directional response" (2019) Nature Materials. 18:234-241, which is incorporated herein by reference as if expressed in its entirety.

A positively charged polymer can be a polymer that has about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, to about 100% of its constitutional units containing a basic or positively charged group (e.g. as pendant group). Stated differently, the positively charged polymers can be a polycation where about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, to about 100% of its constitutional monomers contain a basic or positively charged group. Suitable positively charged polymers include, but are not limited to, positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities (e.g., quaternized polyamine copolymers), cationic polymers that do not have primary or secondary ammonium functionalities (e.g., polyallylamine or polyethylene imine), phosphonium, and combinations thereof. In aspects, the cationic groups of the constituent units can be, without limitation, an amide, an amine (including but not limited to an ammonium containing group), an imine group, an imide group, an azide group, and combinations thereof. The cationic polymer can be a homopolymer or copolymer. In some aspects, the cationic polymer may have 1-100,000 monomeric units. The cationic polymer can be linear or branched. The molecular weight of the cationic polymer can range from 1-100,000.

A negatively charged polymer can be a polymer that has about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, to about 100% of its constitutional units containing an acidic or negatively charged group. Stated differently, the negatively charged polymers can be a polyanion where about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, to about 100% of its constitutional monomers contain an anionic or negatively charged group. Suitable negatively charged polymers include, but are not limited to polyacrylic acids (polyacrylates), polyacrylamides, siloxanes, polysulfonates, polyvinyls, polyphosphates, and combinations thereof. In aspects, the anionic groups of the constituent units can each be individually selected from the group of sulfonates, carboxylates, carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof. The anionic polymer can be a homopolymer or copolymer. In some aspects, the anionic polymer may have 1-100,000 monomeric units. The anionic polymer can be linear or branched. The molecular weight of the anionic polymer can range from 1-100,000.

A neutral polymer can be a polymer that has no constituent or substantially no constituent units that contain a charged (either positively charged or negatively charged) group (e.g. are non-ionic). Suitable neutral polymers can include, but are not limited to, polyethylenes, polyacrylates, polyacrylamides, polyvinyls, polyethers, siloxanes, urethanes, and combinations thereof. The neutral polymer can be a homopolymer or copolymer. In some aspects, the neutral polymer may have 1-100,000 monomeric units. The neutral polymer can be linear or branched. The molecular weight of the neutral polymer can range from 1-100,000.

Photoactivatable Compositions

The polymer(s) previously discussed can be formed from their monomer and/or constituent units. The constituent units can be part of a composition that can be exposed to a light source during an AM process, also referred to herein as a photoresin or photoactivatable composition. Upon exposure to the light source, the constituent units can polymerize to form the 3D structure as previously discussed. For some processes, the constituent units can be provided in a solid powder form (e.g. for SLS and similar methods). For other processes, the composition can be in a liquid form, which can also be referred to as a liquid photoresin. Thus, in some aspects the composition can be formulated for a light-based additive manufacturing process, such as a SLS, a vat-photopolymerization process, and/or material jetting, or other AM process previously described. In addition to the polymer, the composition can contain a photoinitiator, a light absorber, a stabilizer, a sensitizer, and combinations thereof. Other additives can include, but are not limited to, photoinitiators.

Constituent Units

The constituent units are the monomer units (which can themselves be polymers) that can polymerize (or be cured) upon exposure to light. In aspects, the constituent units can optionally be photocrosslinkable. In aspects, the constituent units can be polymerized via a photothermal reaction. Suitable constituent units will be appreciated by one of ordinary skill in the art based at least upon the polymers that can be included in the 3D structure discussed elsewhere herein. Suitable constituent units can include, but are not limited to, positively charged monomers, negatively charged monomers, and/or neutral monomers. Suitable positively charged monomers can include, but are not limited to, ammonium, amine, phosphonium. In aspects, the positively charged monomer can have one or more positively charged (or cationic) groups. Suitable negatively charged monomers can include, but are not limited to, phosphates, carboxyls, thiolates, sulfates, alkoxides, and combinations thereof. In aspects, the negatively charged monomer can have one or more negatively charged (or anionic) groups. In aspects, the anionic groups of the constituent units can each be individually selected from the group of sulfonates, carboxylates, carboxylic acid, a hydroxide containing group, a group containing a halogen ion, an epoxide group, a phosphate group, a nitrate group, and combinations thereof. Suitable neutral monomers can include, but are not limited to, hexane diol diacrylate, polyethylene glycol diacrylate, polyacrylates, polyethers, polyvinyls, thioethers, epoxys, siloxanes and combinations thereof.

Photoinitiators

The composition can include a photoinitiator. Photoinitiators are compounds that undergo a photo reaction on absorption of light to produce a reactive species, which are capable of initiating or catalyzing chemical reactions, such as polymerization of constituent units present in the composition. Suitable photoinitiators that can be included in a photoactivatable composition can include, but are not limited to, radical photoinitiators, initiation compounds for thiol-ene and thiol-yne systems, addition-fragmentation chain transfer (AFCT) reagents, cationic photoinitiators, anionic photoinitiators, hybrid (meth)acrylate/epoxy monomers, two-photon initiators (TPA imitators), and combinations thereof. Other classes of photoinitiators will be appreciated by those of ordinary skill in the art and are within the scope of this disclosure.

Radical photoinitiators can include Type I initiators (e.g. single molecules that cleave into radical fragments when exposed to a light of an appropriate wavelength, including but not limited to, those containing benzoyl groups, e.g. benzil ketals (e.g., for the class, Darocur 1173, Irgacure 184, Irgacure 651, and Irgacure 369), acyl phosphine oxides (e.g., for the class, TPO, BDPO, TMMPO, TMDPO, PBDPO, TFBDPO, DFDPO, NDPO, and BAPO (Irgacure 819 and Irgacure 1800)), and germanium imitators (e.g., for the class, Ivocerin)) and Type II initiators (e.g. two component systems containing a light absorbing molecule (or sensitizer) along with a co-initiator (or synergist)), (e.g., for the class, benzophenones/amines, thioxanthones/amines). Others are commercially available will be appreciated by one of ordinary skill in the art. In aspects, the photoinitiator can absorb light in the UV range (e.g. UV-A, UV-B, or UV-C). In aspects, the photoinitiator can be included in the composition at 0 (e.g. no photoinitiator included) to about 10 weight percent of the total composition by weight.

Stabilizers, Light Absorbers, and Other Additives

Photoactivatable compositions can optionally include a stabilizer, light absorber, other additives, or a combination thereof. Radical inhibitors can be included to prevent or minimize premature polymerization of the constituent units. Suitable radical inhibitors can include, but are not limited to, butylated hydroxy toluene, methoxy hydroquinone, Benzyl N,N' dimethyl amine (BDMA) and related amines. In some aspects, the radical inhibitor can be included in a photoresin at about 5 to 250 ppm. One of ordinary skill in the art will appreciate that this depends on, e.g., the inhibitor included. For example, butylated hydroxy toluene and methoxy hydroquinone can be included at about 5-200 ppm, while BDMA can be included at about 5 to 250 ppm in photoresins with about 1 wt % photoacid generator. Suitable stabilizers can include, but are not limited to, esters of 9-anthranoic acid and anthracene derivatives, A light absorber can be included to reduce the penetration depth ($D_p$), which can allow for thinner layers and improve the z-resolution. Suitable light absorbers can include, but are not limited to, sudan derivatives, bisphenol derivatives, pyrene and substituted anthracenes (e.g. 2-ethyl-9,10-dimethoxy anthracene (EDMA)), stilbene derivatives (e.g. 1,4-bis(2-dimethylstyryl)benzene (BMSB), and block copolymers based on styrene-butadiene-methyl methacrylate (SBM).

A sensitizer can be included to allow curing with higher wavelengths of light (or lower the $E_c$ at a particular wavelength of light). Suitable sensitizers can include, but are not limited to, pyrene and substituted anthracenes, aromatic nitro and keto-based sensitizers, 2-benzoylmethylene-1-methyl-β-naphthothiozoline and triphenyl pyrylium salt derivatives and combinations thereof.

Functional materials, particulates, fibers and other functional additives and colloids can be incorporated. Suitable functional additives can include, but not limited to lead zirconate titanate, barium titanate, magnetic, aluminum oxide, silicon carbide, graphene. This will make the process compatible with multi-functional materials, including but not limited to piezoelectrics, thermoelectrics, magnetics and multi-ferroic materials.

A photoinhibitor can be included to allow curing at finer resolutions by two beams of light instead of one by quenching radicals. McLeod, R. R.; Bowman, C. N.; Scott, T. F.; Sullivan, A. C. Diffraction Unlimited Photolithography. US20120092632A1, Apr. 19, 2012, which is incorporated herein by reference as if expressed in its entirety.

Dyes

In aspects, the photoactivatable composition can include one or more dyes or pigments. In, aspects the dyes or pigments can be photoreactive. The dyes can be light absorbing. The dyes can be fluorescent dyes. Dyes can be sensitizers. The dye can be acidic or basic. Suitable dyes that can be included will be appreciated by those of ordinary skill in the art in view of this disclosure.

Solvents

The liquid photoactivatable composition can be can be aqueous or non-aqueous. Aqueous liquid compositions can include one or more water-soluble organic solvents in addition to water. Suitable water-soluble organic solvents that can be included in the polymer composition can include, but are not limited to, e.g., alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or keto-alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, hexylene glycol and diethylene glycol; 1,2,6-hexanetriol; thiodiglycol; glycerol; lower alkyl ethers of polyhydric alcohols, such as ethylene glycol monomethyl or -ethyl ether, diethylene glycol methyl or ethyl ether and triethylene glycol monomethyl or -ethyl ether; and also N-methyl-2-pyrrolidone, 2-pyrrolidone, and 1,3-dimethyl-2-imidazolidinone.

The water-soluble organic solvent as described above can be contained in an amount ranging from about 0 to 85% by weight based on the total weight of the liquid formulation. The water may be contained in an amount ranging from about 50 to 100% by weight, based on the total weight of the liquid formulation.

In some aspects, the liquid formulation can contain an amount of glycerol. The glycerol may preferably be contained in an amount ranging from 2 to 10% by weight based on the total weight of the liquid formulation.

The electroless selective deposition techniques described herein can be used to manufacture structures for a variety of applications where structures with one or more materials deposited on their surface are desired. In aspects, the electroless selective deposition techniques described herein can be used to generate 3D printed functional devices such as integrated circuits, micro-electro-mechanical systems, antenna, sensors, actuators, and metamaterials.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1

This Example can at least demonstrate aspects of a method to develop 3D structures with one or more selectively deposited materials in one or more locations on the 3D structure. As shown in FIG. 1 a 3D polymeric object or structure having positively charged, negatively charged, and/or neutral polymeric regions can be generated from charged a photoresin(s) containing ionic monomers (in the case of light-based 3D printing) or charged polymeric feedstock materials (e.g. in the case of FDM/FFF printing) (not shown). A multimaterial 3D object can be generated using a suitable 3D printing technique. This can result in a 3D printed structure having positively charged regions (denoted by the + symbols in FIG. 1) and negatively charged regions (denoted by the − symbol in FIG. 1). Neutral photoresins and subsequent parts are not shown in FIG. 1. After manufacturing of the multilateral 3D object, whether 3D printed or otherwise manufactured, the 3D object can then be subjected to rounds of electroless plating, with each round including priming selective regions of the 3D structure with a charged deposition catalyst based on differential surface charges, subsequently exposing the 3D object to a material to be deposited, allowing deposition to occur via autocatalysis at regions where the deposition catalyst is located, and washing the structure after deposition occurs. As shown, for example, in FIG. 1, a negatively charged deposition catalyst (e.g. $Pd^-$) can be exposed to the 3D structure. The negatively charged deposition catalyst can attach or otherwise associate with regions of the 3D structure with the opposite charge. The 3D structure can then be exposed to a material to be deposited (e.g. a metal (Metal 1 in FIG. 1). Autocatalysis and attachment and deposition of the material with then occur on the 3D structure in locations where the deposition catalyst is present without the need for a current. In this way, the material can be deposited in selective locations on the 3D structure without the use of a current. In this specific example shown in FIG. 1, this would be the positively charged regions of the 3D structure. After this first round of electroless plating, a second round of plating can occur. Between rounds, one or more washing steps can be completed. In this subsequent round, the partially plated 3D structure (already partially plated in regions having a positive charge) to a positively charged deposition catalyst (e.g. $Pd^+$ in FIG. 1). The positively charged deposition catalyst can attach or otherwise associate with the negatively charged regions of the 3D structure. The 3D structure can then be exposed to a second material (e.g. Metal 2 in FIG. 1). The second material can be attached and deposited on the 3D structure via auto catalysis where the deposition catalyst is present (e.g. the negatively charged regions of the 3D structure as shown in the example shown in FIG. 1).

Figure 2:
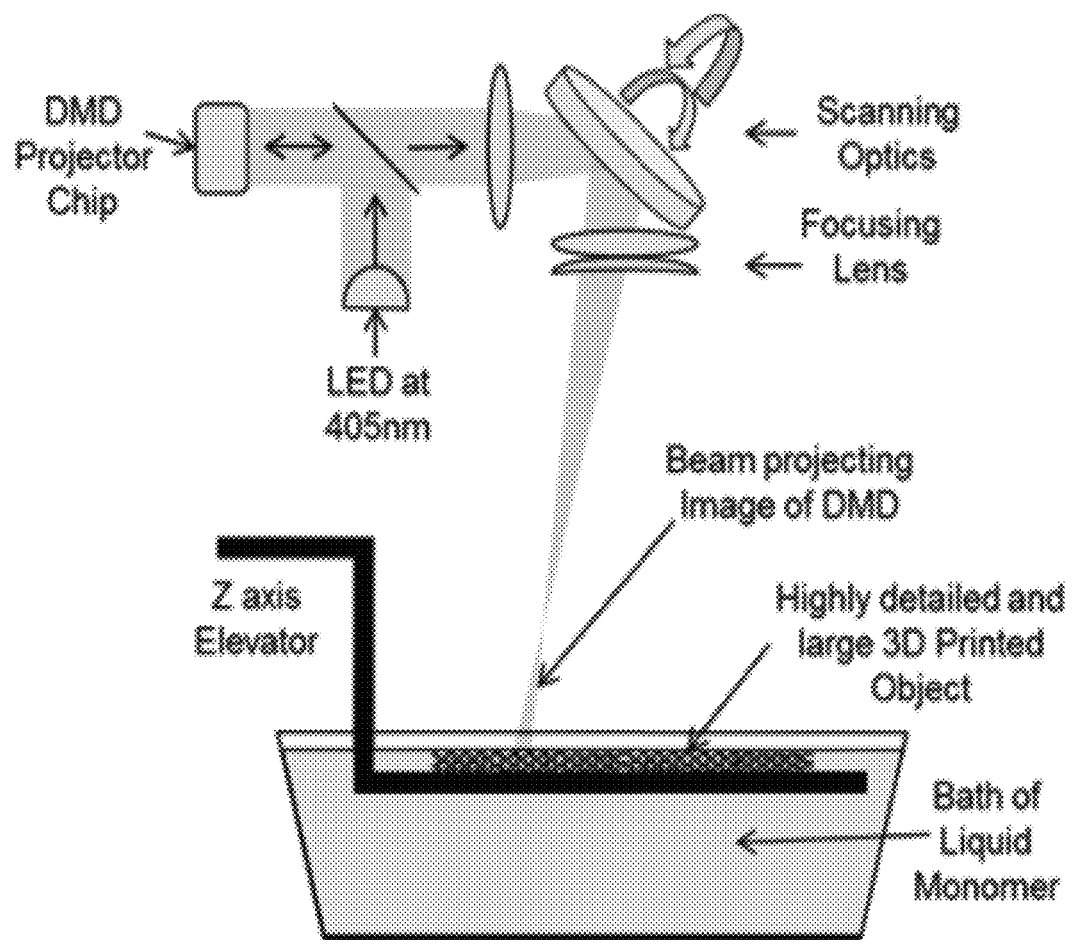
FIG. 2 shows a general overview of aspects of an example light-based additive manufacturing process that can be used to form a 3D structure that can contain one or more charged regions that can be exploited in aspects of the electroless selective deposition process described herein.

FIG. 2 shows an example of a light-based additive manufacturing method that can be used to form a 3D object that can include one or more charged and/or neutral regions that can be subsequently selectively plated with one or more materials. One example of a light-based additive manufacturing method that can be used is set forth in Pat. App. Pub. No. WO 2018/013829, which is incorporated by reference as if expressed herein in its entirety.

Figure 3A:
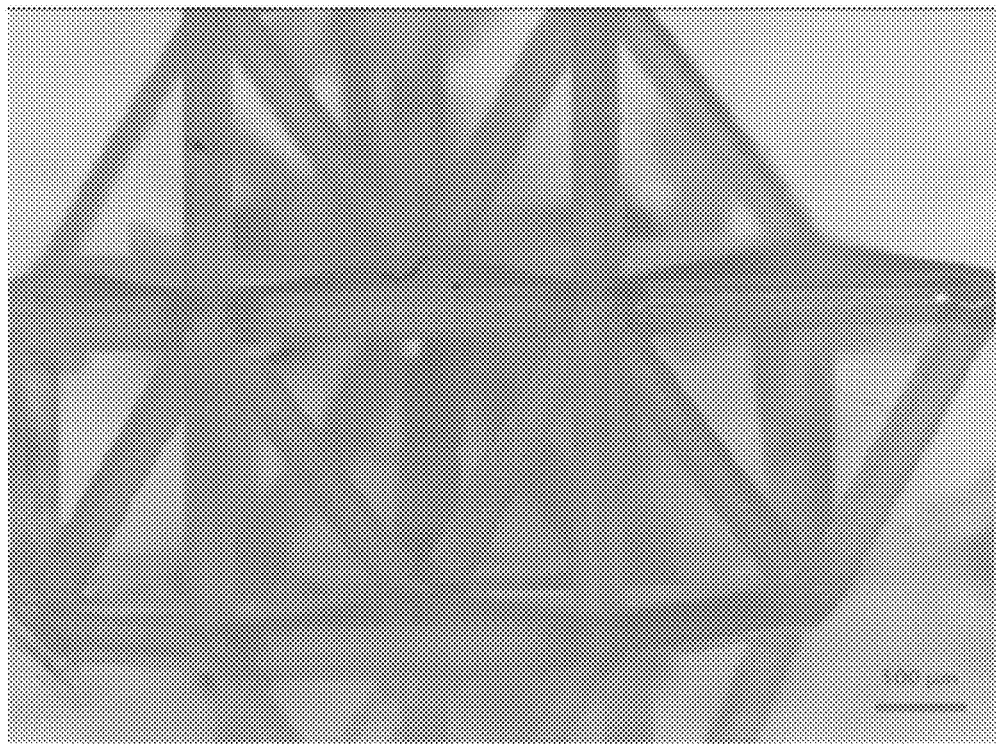
FIGS. 3A-3B show (FIG. 3A) a 3D structure having at least two differentially charged regions after 3D printing and before selective deposition of material according to aspects of the method described herein and (FIG. 3B) after selective deposition of material according to aspects of the method described herein. The light grey regions in FIGS. 3A and 3B are areas of the 3D structure without deposition of a metal material. The dark grey region(s) in FIG. 3B are areas of the 3D structure where a metal material has been deposited.
Figure 3B:
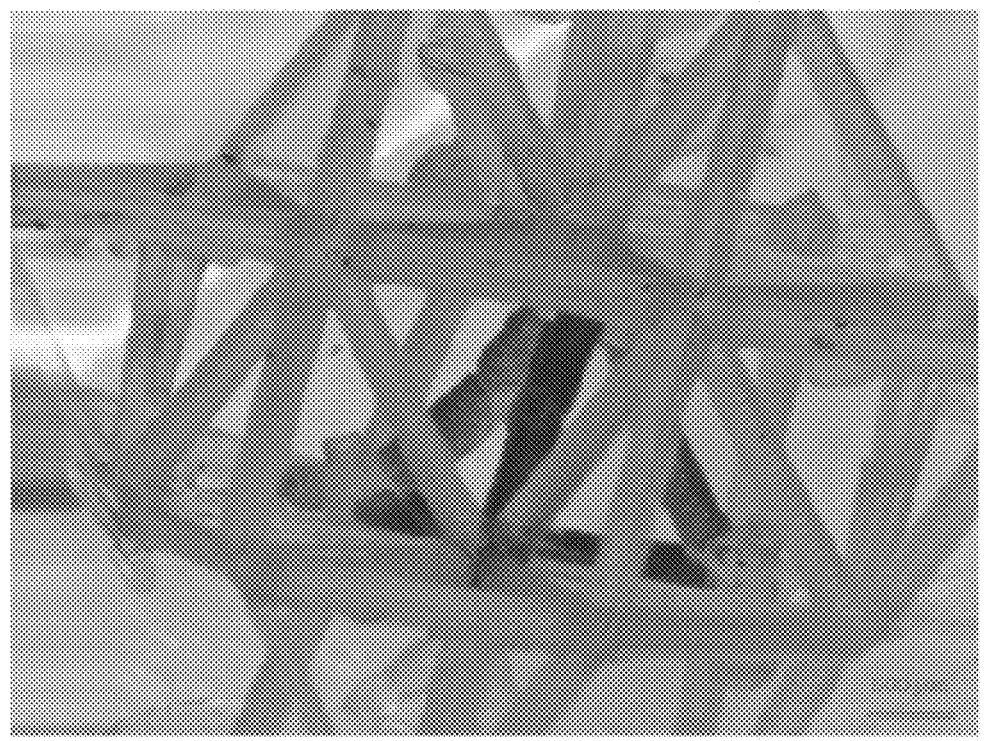
Figure 4:
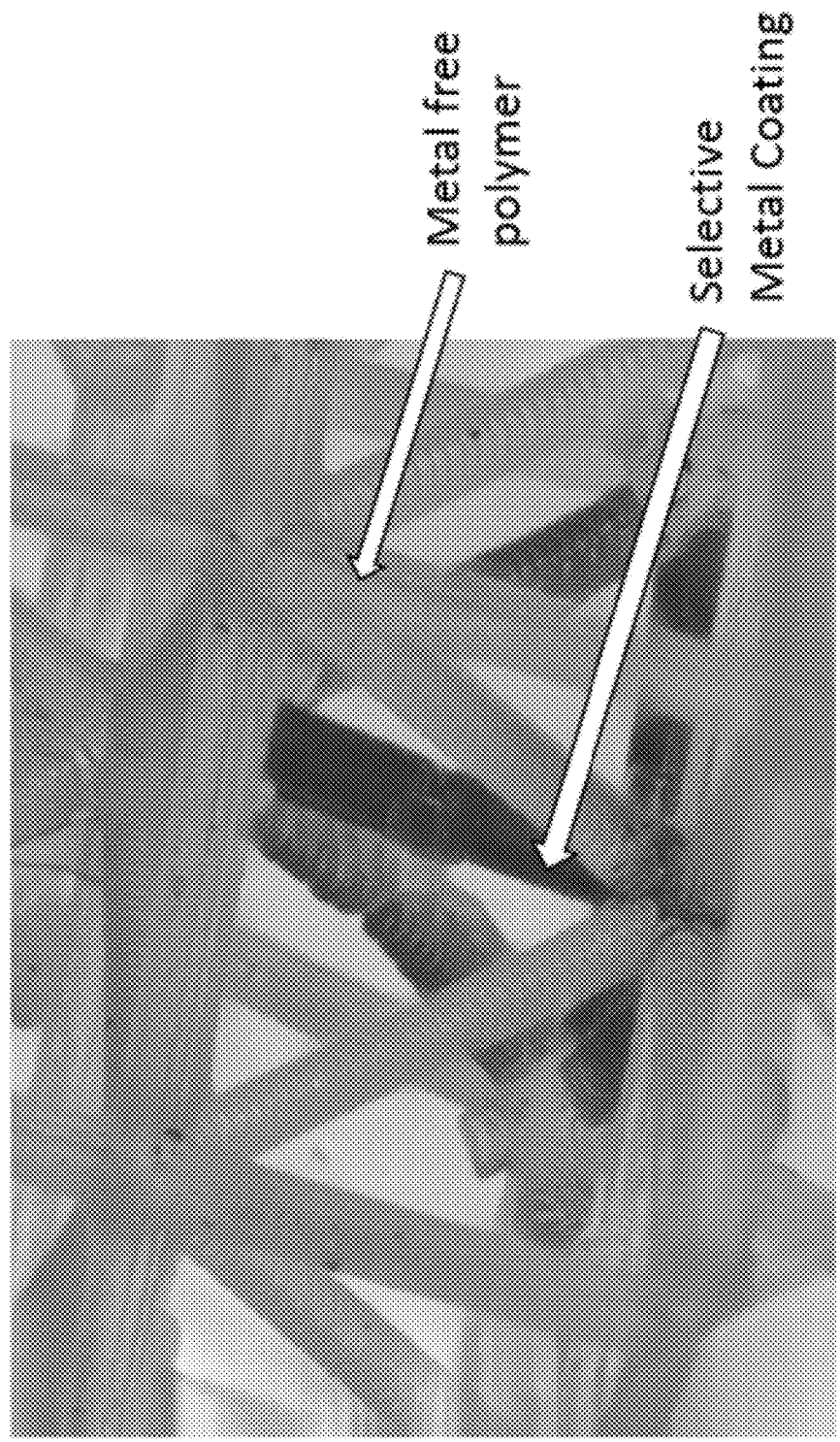
FIG. 4 is a close-up/different view of the structure in FIG. 3B.

FIGS. 3A-3B and 4 shows images of a selectively metal plated part made by AM. As shown in FIG. 3A the part was originally all one color (light gray in the greyscale image of FIG. 3A). After one round of electroless metal plating as described in FIG. 1 a thin layer of nickel alloy was deposited on selective areas of the 3D structure (dark grey regions in the grey scale images of FIGS. 3B and 4). The struts in the 3D structures in these images are approximately 300 microns in diameter, but the size of the structure can be decreased as further.

Figure 5:
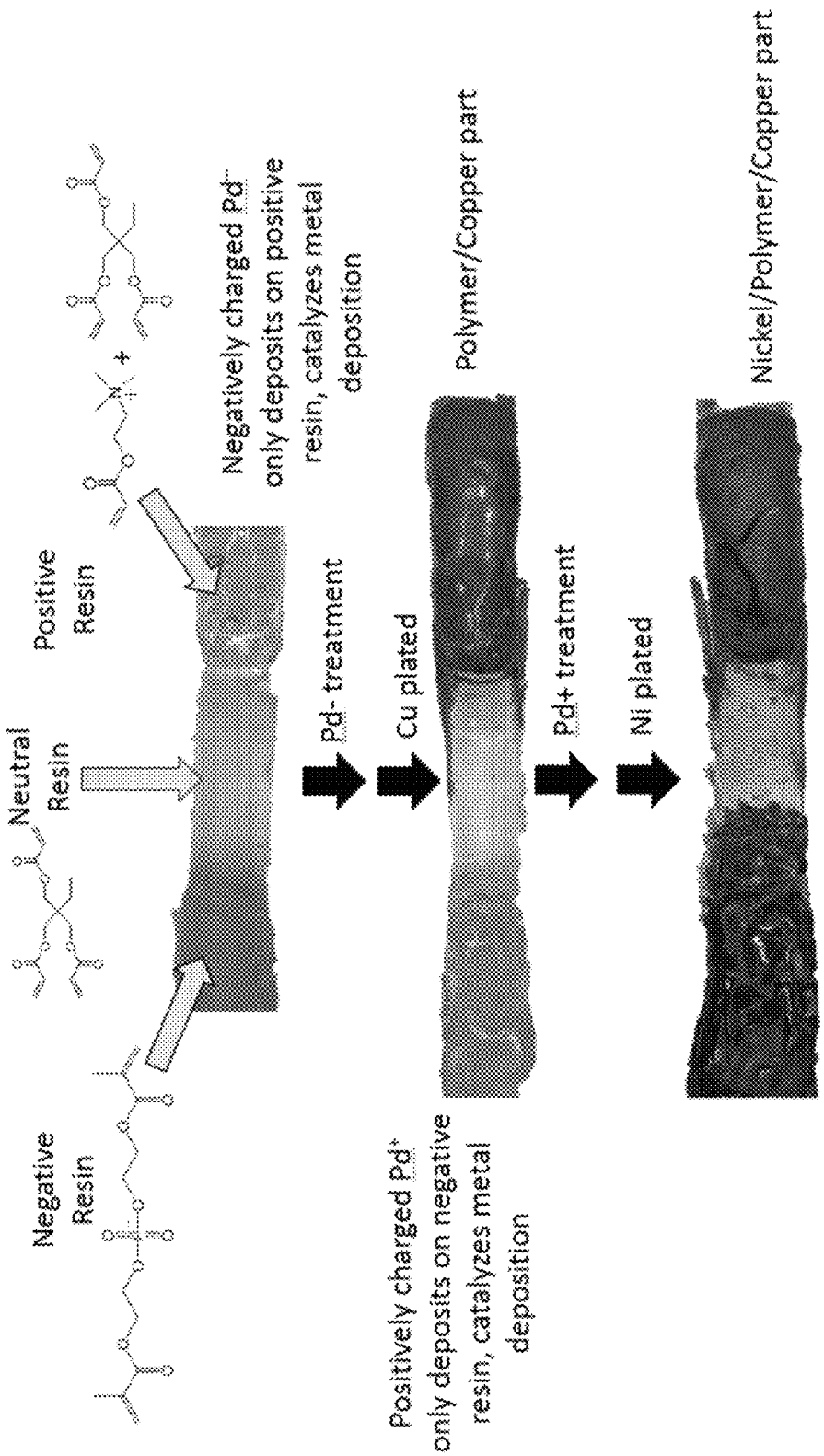
FIG. 5 shows multi-material deposition on a film according to aspects of the electroless deposition method described herein.

FIG. 5 can demonstrate plating of multiple materials on the same part. While FIG. 5 shows a film, it will be appreciated that the same method can be applied to a 3D structure such as that discussed in FIG. 1 and demonstrated in FIGS. 3A-3B and 4. In the film of FIG. 5, there are three resins, negative, positive, and neutral. First copper was plated on the positive resin according to the methodology described in connection with FIG. 1. Subsequently, nickel was plated on the negative resin according to the methodology described in connection with FIG. 1. The thickness and uniformity of deposition can be modified by optimizing the specific reaction parameters. The neutral resin is substantially free of metal deposition but for some contamination that was likely from how the part is handled during processing which can be minimized by careful handling and optimization of the reaction conditions.

Figure 6A:
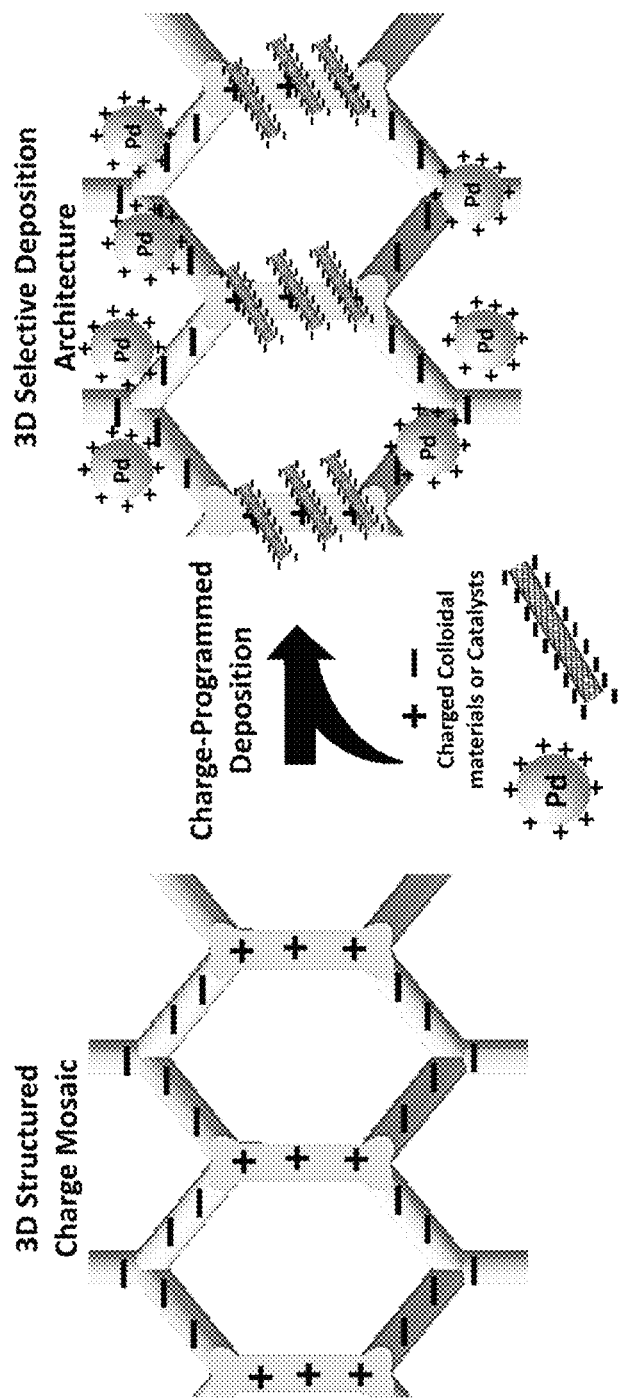
FIGS. 6A-6E show a schematic and images that can demonstrate material deposition according to aspects of the method described herein on 3D structures having microfeatures.
Figures 6B, 6C:
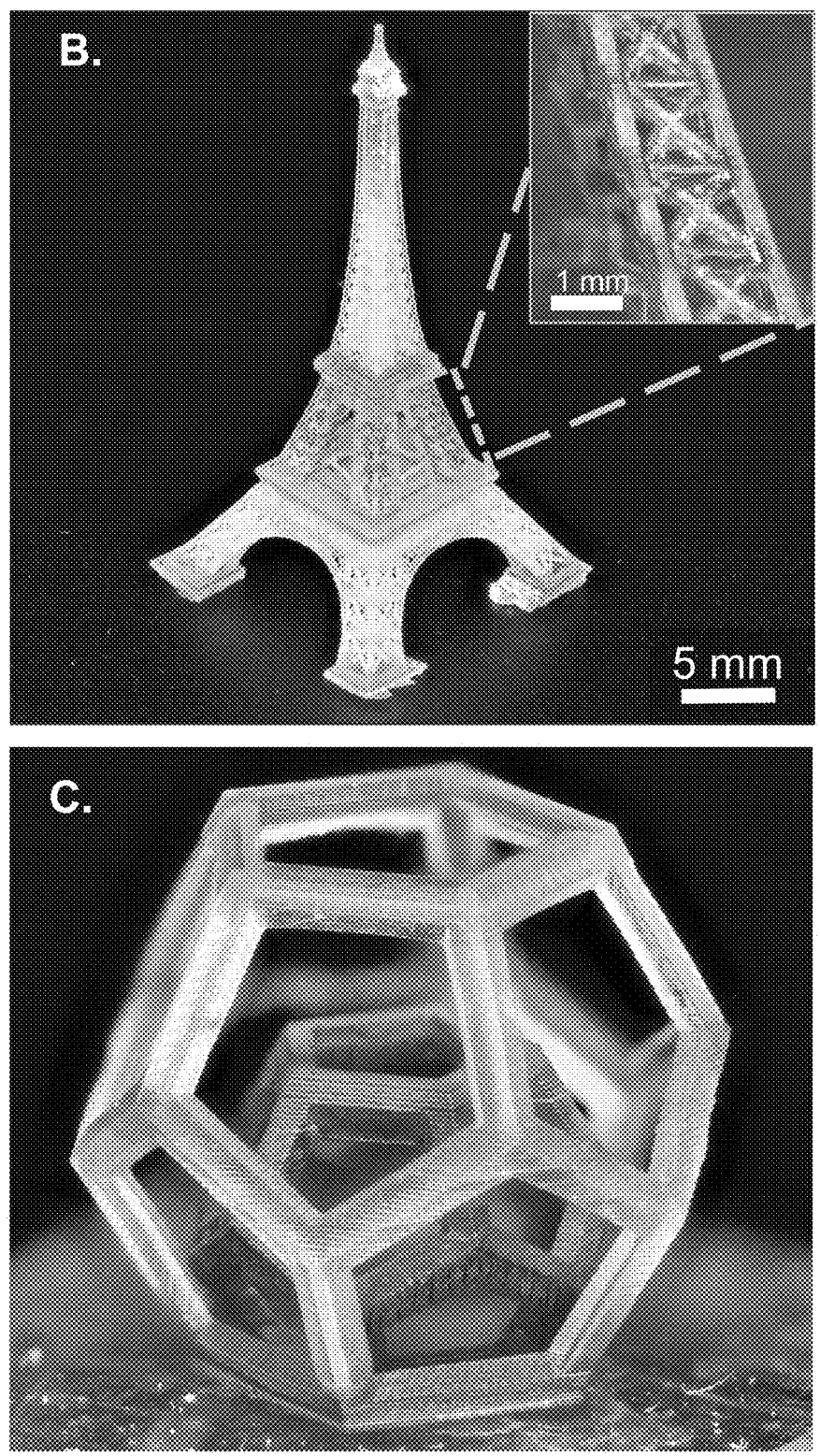
Figures 6D, 6E:
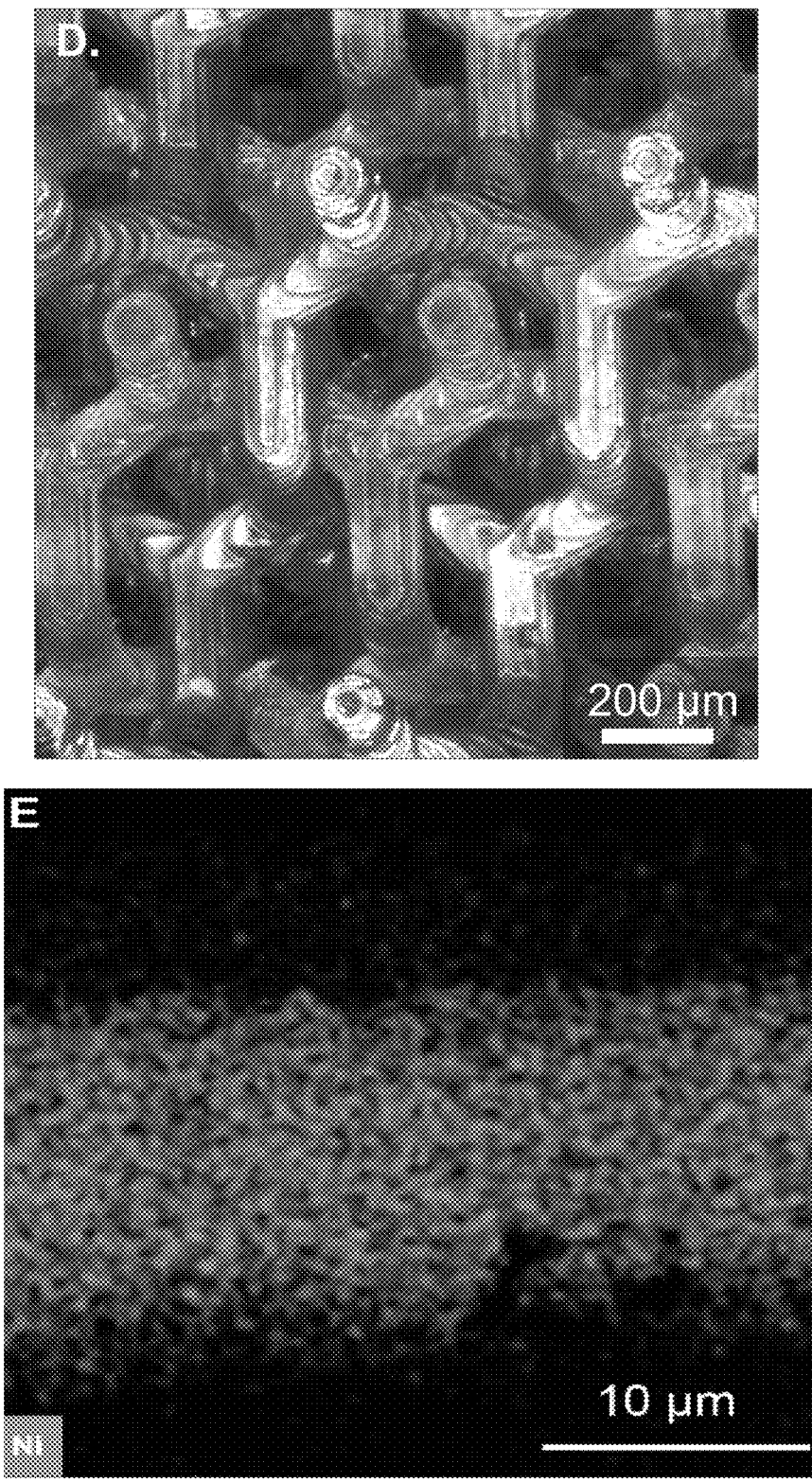

FIGS. 6A-6E show a schematic and images that can demonstrate material deposition according to aspects of the method described herein on 3D structures having microfeatures. FIG. 6A shows a schematic demonstrating a charge mosaic that can be formed that combines positive, negative, and neutral areas and can represent a patterned substrate upon which selective electroless deposition of materials can be completed by exploitation of the charge difference between each differentially charged region. FIGS. 6B-6D shows an images of a 3D structures having microfeatures that contains multiple materials (e.g. Ni—P or Cu) selectively deposited on its surface and that was generated by aspects of the method described herein using Pd ions as a catalyst. FIG. 6E is a microscopic image that demonstrates the resolution of the 3D printing and/or deposition technique described herein is approximately 10 microns.

Figure 7A:
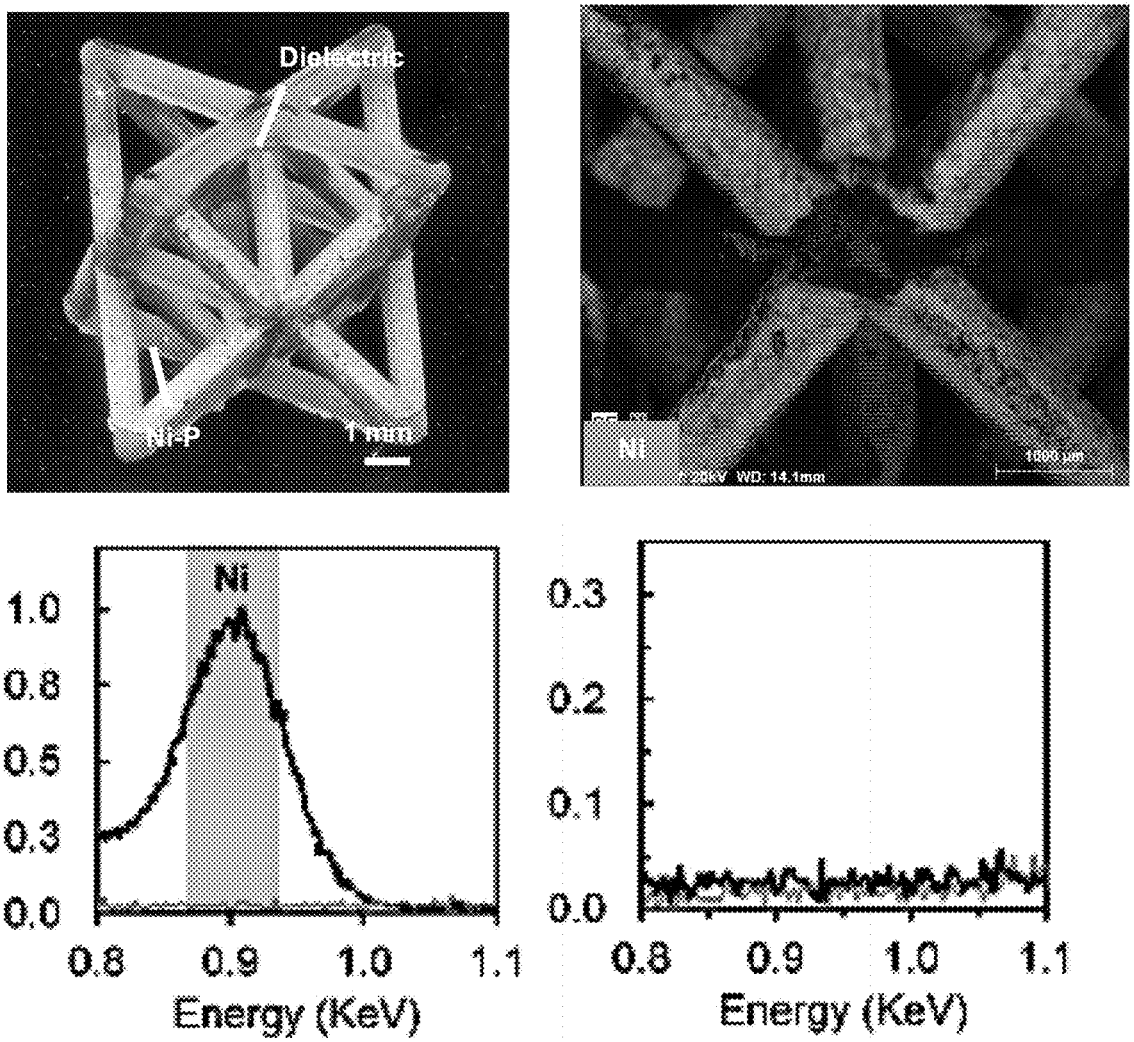
FIGS. 7A-7B show images and graphs that can demonstrate plating of multiple materials through successive deposition schemes that can create further combinations of dielectric/conductor/semiconductor etc.
Figure 7B:
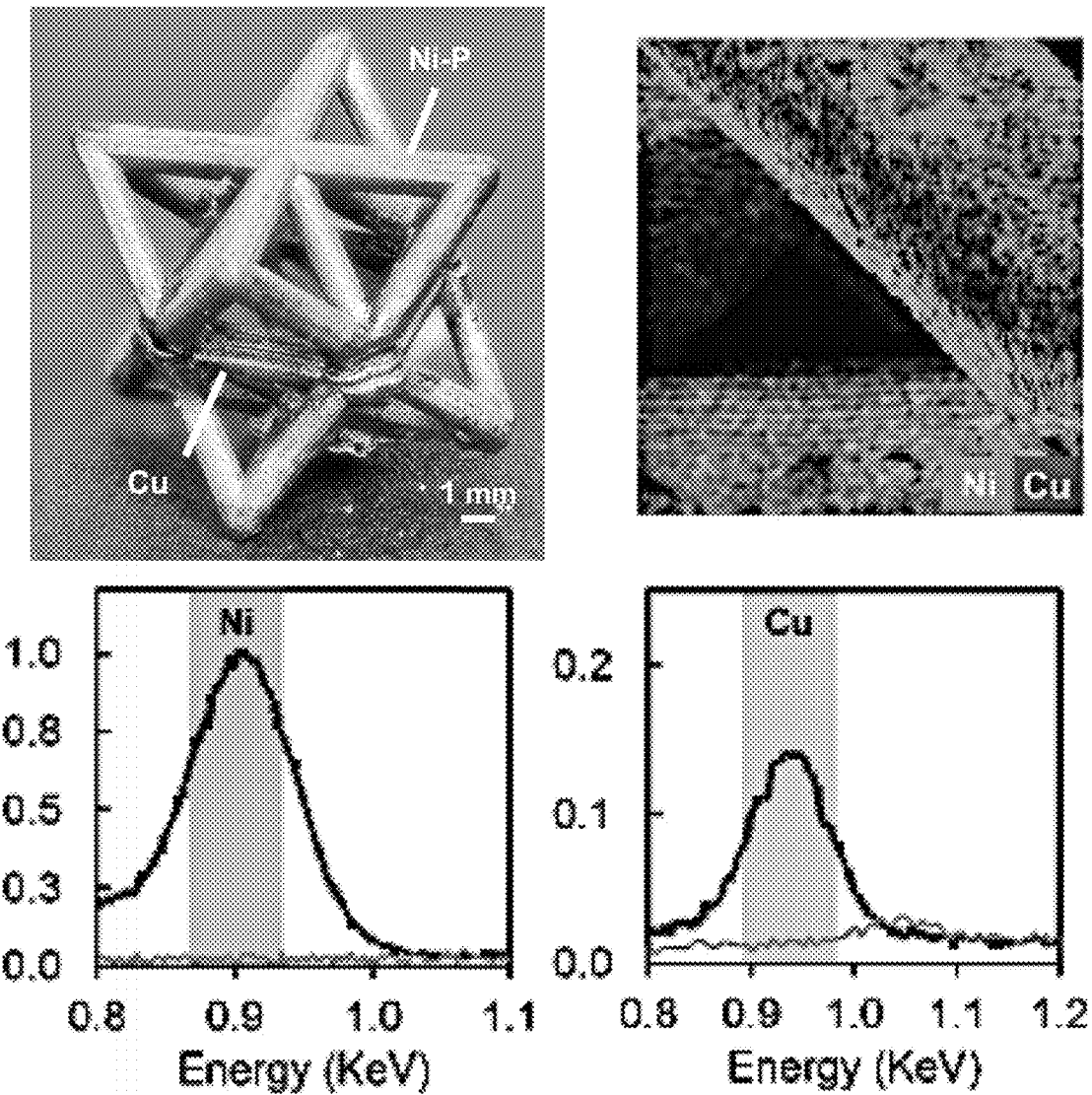

FIGS. 7A-7B show images and graphs that can demonstrate plating of multiple materials through successive deposition schemes that can create further combinations of dielectric/conductor/semiconductor etc. FIG. 7A shows images and graphs that demonstrate Ni—P and Cu metal/dielectric combination of materials and their functionality. FIG. 7B shows images and graphs that demonstrate bimetallic Cu and Ni—P octet-truss unit cell according to aspects of the method described herein.

Further attributes, features, and embodiments of the present invention can be understood by reference to the following numbered aspects of the disclosed invention. Reference to disclosure in any of the preceding aspects is applicable to any preceding numbered aspect and to any combination of any number of preceding aspects, as recognized by appropriate antecedent disclosure in any combination of preceding aspects that can be made. The following numbered aspects are provided:

1. A method of electroless selective material deposition comprising:
    a) forming a multi-material three-dimensional (3D) structure, wherein the multi-material 3D structure is formed with at least two polymers selected from the group consisting of: a negatively charged polymer, a positively charged polymer, and a neutral polymer, so as to form at least two differentially charged regions of the multi-material 3D structure selected from the group of: a negatively charged region, a positively charged region, and a neutral region; and
    b) optionally bringing the multi-material 3D structure to a certain pH to activate or deactivate certain regions to be either neutral, positive, or negatively charged
    c) optionally exposing the multi-material 3D structure to a deposition catalyst, wherein the deposition catalyst is positively charged or negatively charged
    wherein a positively charged deposition catalyst associates or attaches to negatively charged region(s), wherein a negatively charged deposition catalyst attaches to positively charged region(s), and wherein substantially no deposition catalyst attaches to neutral region(s) present in the multi-material 3D structure;
    d) exposing the multi-material 3D structure from step c) to a first material to be deposited and allowing autocatalysis, attachment, and/or deposition of the first material on the 3D structure in regions where the deposition catalyst is present or if no catalyst is present to oppositely charged region(s).
    wherein if the deposition material is positively charged it associates or attaches to the negatively charged region(s), wherein a negatively charged material associates or attaches to positive charged region(s), and wherein substantially no material attaches to neutral region(s) present in the multi-material 3D structure;
    e) optionally treating the multi-material 3D structure after step d) to remove the deposition catalyst present after step c);
    f) optionally treating the multi-material 3D structure after step e) to activate regions with no deposition material to become positive, negative, or neutral wherein if this step does not occur there may still be positive, negative or neutrally charged regions in the multi-material 3D structure;

g) optionally treating the 3D structure after step f) to coat the previously deposited regions from step d) to become positive, negative or neutral;

h) optionally repeating step c); and i) optionally exposing the 3D structure from step h) to a second material to be deposited and allowing autocatalysis, attachment, and/or deposition of the second material on the 3D structure in regions where the deposition catalyst is present or if no catalyst is present to oppositely charged region(s), wherein if the deposition material is positively charged it associates or attaches to the negatively charged region(s), wherein a negatively charged material associates or attaches to positive charged region(s), and wherein substantially no material attaches to neutral region(s) present in the 3D structure;

j) optionally repeating steps e) through i) to build multiple layers upon previously deposited layers until a desired number of deposited layers is reached; and k) optionally using direct or contactless electrochemical methods to deposit or remove materials on electrically independent areas.

2. The method of aspect 1, wherein the step of forming the multi-material 3D structure comprises forming the multi-material 3D structure using a multi-material additive manufacturing process.

3. The method of aspect 2, wherein the multi-material additive manufacturing is a light-based multi-material additive manufacturing process.

4. The method of any one of aspects 1-3, wherein the multi-material 3D structure comprises micro-scale features.

5. The method of any of aspects 1-4, wherein the negatively charged polymer is selected from the group consisting of: polyacrylic acids (polyacrylates), polyacrylamides, siloxanes, polysulfonates, polyvinyls, polyphosphates, and combinations thereof.

6. The method of any of aspects 1-5, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

7. The method of any of aspects 1-6, wherein the positively charged polymer is selected from the group consisting of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof.

8. The method of any of aspects 1-7, wherein the positively charged polymer comprises one or more cationic groups, wherein each of the one or more cationic groups can be individually selected from the group consisting of: an amide, an amine, an imine, an imide, an azide group, phosphonium group, and combinations thereof.

9. The method of any of aspects 1-8, wherein the neutral polymer is selected from the group consisting of: polyethylenes, polyacrylates, polyacrylamides, polyvinyls, polyethers, siloxanes, urethanes and combinations thereof.

10. The method of any of aspects 1-9, wherein the deposition catalyst is a positively or negatively charged ion of a metal selected from the group consisting of: Pd, Pt, Ru, Ni, Co, Cu, Zn, Cr, Fe, Pb, Sn, Ag, Hg, Mn, and combinations thereof.

11. The method of any one of any of aspects 1-10, wherein the negatively charged polymer is selected from the group consisting of: polyacrylic acids (polyacrylates), polyacrylamides, siloxanes, polysulfonates, polyvinyls, polyphosphates, and combinations thereof.

12. The method of any of aspects 1-11, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

13. The method of any one of any of aspects 1-12, wherein the positively charged polymer is selected from the group consisting of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof.

14. The method of any of aspects 1-13, wherein the positively charged polymer comprises one or more cationic groups, wherein each of the one or more cationic groups can be individually selected from the group consisting of: an amide, an amine, an imine, an imide, an azide group, phosphonium group, and combinations thereof.

15. The method of any one of any of aspects 1-14, wherein the neutral polymer is selected from the group consisting of: polyethylenes, polyacrylates, polyacrylamides, polyvinyls, polyethers, siloxanes, urethanes, and combinations thereof.

16. The method of any one of aspects 1-15, wherein the deposition catalyst is a positively or negatively charged ion of a metal selected from the group consisting of: Pd, Pt, Ru, Ni, Co, Cu, Zn, Cr, Fe, Pb, Sn, Ag, Hg, Mn, and combinations thereof.

17. A method of electroless selective material deposition comprising:

a) exposing the multi-material 3D structure to a deposition catalyst, wherein the deposition catalyst is positively charged or negatively charged, wherein the multi-material 3D structure is formed with at least two polymers selected from the group consisting of: a negatively charged polymer, a positively charged polymer, and a neutral polymer, so as to form at least two differentially charged regions of the multi-material 3D structure selected from the group of: a negatively charged region, a positively charged region, and a neutral region,
wherein a positively charged deposition catalyst associates or attaches to negatively charged region(s), wherein a negatively charged deposition catalyst attaches to positively charged region(s), and wherein substantially no deposition catalyst attaches to neutral region(s) present in the 3D structure;

b) exposing the multi-material 3D structure from step a) to a first material to be deposited and allowing autocatalysis, attachment, and/or deposition of the first material on the 3D structure in regions where the deposition catalyst is present, c) washing the 3D structure after step b) to remove the deposition catalyst present after step c);

d) optionally repeating step a) wherein the charge of the deposition catalyst is opposite from that of the catalyst used in step b); and e) optionally exposing the 3D structure from step d) to a second material to be deposited and allowing autocatalysis, attachment, and/or deposition of the second material on the 3D structure in regions where the deposition catalyst is present.

18. The method of aspect 17, wherein the multi-material 3D structure is formed using a multi-material additive manufacturing process.

19. The method aspect 18, wherein the multi-material additive manufacturing is a light-based multi-material additive manufacturing process.

20. The method of any of aspects 17-19, wherein the multi-material 3D structure comprises micro-scale features.

21. The method of any of aspects 17-20, wherein the negatively charged polymer is selected from the group consisting of: polyacrylic acids (polyacrylates), polyacrylamides, siloxanes, polysulfonates, polyvinyls, polyphosphates, and combinations thereof.

22. The method of any of aspects 17-21, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

23. The method of any of aspects 17-23, wherein the positively charged polymer is selected from the group consisting of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof.

24. The method of any of aspects 17-23, wherein the positively charged polymer comprises one or more cationic groups, wherein each of the one or more cationic groups can be individually selected from the group consisting of: an amide, an amine, an imine, an imide, an azide group, phosphonium group, and combinations thereof.

25. The method of any of aspects 17-24, wherein the neutral polymer is selected from the group consisting of: polyethylenes, polyacrylates, polyacrylamides, polyvinyls, polyethers, siloxanes, urethanes, and combinations thereof.

26. The method of any of aspects 17-25, wherein the deposition catalyst is a positively or negatively charged ion of a metal selected from the group consisting of: Pd, Pt, Ru, Ni, Co, Cu, Zn, Cr, Fe, Pb, Sn, Ag, Hg, Mn, and combinations thereof.

27. The method of any one of aspects 17-26, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

28. The method of any one of aspects 17-27, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

29. The method of any one of any one of aspects 17-28, wherein the positively charged polymer is selected from the group consisting of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof.

30. The method of any one of aspects 17-29, wherein the positively charged polymer comprises one or more cationic groups, wherein each of the one or more cationic groups can be individually selected from the group consisting of: an amide, an amine, an imine, an imide, an azide group, phosphonium group, and combinations thereof.

31. The method of any one of any one of aspects 17-30, wherein the neutral polymer is selected from the group consisting of: polyethylenes, polyacrylates, polyacrylamides, polyvinyls, polyethers, siloxanes, urethanes, and combinations thereof.

32. The method of any one of any one of aspects 17-31, wherein the deposition catalyst is a positively or negatively charged ion of a metal selected from the group consisting of: Pd, Pt, Ru, Ni, Co, Cu, Zn, Cr, Fe, Pb, Sn, Ag, Hg, Mn, and combinations thereof.

33. The method of any one any one of aspects 17-32, further comprising the step of forming a multi-material three-dimensional (3D) structure, wherein the multi-material 3D structure is formed with at least two polymers selected from the group consisting of: a negatively charged polymer, a positively charged polymer, and a neutral polymer, so as to form at least two differentially charged regions of the multi-material 3D structure selected from the group of: a negatively charged region, a positively charged region, and a neutral region before step b).

34. A 3D structure produced the method of any one of any one of aspects 1-33.

What is claimed is:

1. A method of electroless selective material deposition comprising:
    a) forming a multi-material three-dimensional (3D) structure, wherein the multi-material 3D structure is formed with at least two polymers selected from the group consisting of: a negatively charged polymer, a positively charged polymer, and a neutral polymer, so as to form at least two differentially charged regions of the multi-material 3D structure selected from the group of: a negatively charged region, a positively charged region, and a neutral region;
    b) bringing the multi-material 3D structure to a certain pH to activate or deactivate certain regions to be either neutral, positive, or negatively charged;
    c) exposing the multi-material 3D structure to a deposition catalyst, wherein the deposition catalyst is positively charged or negatively charged, wherein a positively charged deposition catalyst associates or attaches to negatively charged region(s), wherein a negatively charged deposition catalyst attaches to positively charged region(s), and wherein substantially no deposition catalyst attaches to neutral region(s) present in the multi-material 3D structure;
    d) exposing the multi-material 3D structure from step c) to a first material to be deposited and allowing autocatalysis, attachment, and/or deposition of the first material on the 3D structure in regions where the deposition catalyst is present or if no catalyst is present to oppositely charged region(s), wherein if the deposition material is positively charged it associates or attaches to the negatively charged region(s), wherein a negatively charged material associates or attaches to positive charged region(s), and wherein substantially no material attaches to neutral region(s) present in the multi-material 3D structure;
    e) optionally treating the multi-material 3D structure after step d) to remove the deposition catalyst present after step c);
    f) optionally treating the multi-material 3D structure after step e) to activate regions with no deposition material to become positive, negative, or neutral wherein if this step does not occur there may still be positive, negative or neutrally charged regions in the multi-material 3D structure;
    g) optionally treating the 3D structure after step f) to coat the previously deposited regions from step d) to become positive, negative or neutral;
    h) optionally repeating step c);
    i) optionally exposing the 3D structure from step h) to a second material to be deposited and allowing autocatalysis, attachment, and/or deposition of the second material on the 3D structure in regions where the deposition catalyst is present or if no catalyst is present to oppositely charged region(s), wherein if the deposition material is positively charged it associates or attaches to the negatively charged region(s), wherein a negatively charged material associates or attaches to positive charged region(s), and wherein substantially no material attaches to neutral region(s) present in the 3D structure;
    j) optionally repeating steps e) through i) to build multiple layers upon previously deposited layers until a desired number of deposited layers is reached; and
    k) optionally using direct or contactless electrochemical methods to deposit or remove materials on electrically independent areas.

2. The method of claim 1, wherein the step of forming the multi-material 3D structure comprises forming the multi-material 3D structure using a multi-material additive manufacturing process, wherein the multi-material additive manufacturing process is optionally a light-based multi-material additive manufacturing process.

3. The method of claim 1, wherein the multi-material 3D structure comprises micro-scale features.

4. The method of claim 1, wherein the negatively charged polymer is selected from the group consisting of: polyacrylic acids (polyacrylates), polyacrylamides, siloxanes, polysulfonates, polyvinyls, polyphosphates, and combinations thereof.

5. The method of claim 4, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

6. The method of claim 1, wherein the positively charged polymer is selected from the group consisting of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof.

7. The method of claim 6, wherein the positively charged polymer comprises one or more cationic groups, wherein each of the one or more cationic groups can be individually selected from the group consisting of: an amide, an amine, an imine, an imide, an azide group, phosphonium group, and combinations thereof.

8. The method of claim 1, wherein the neutral polymer is selected from the group consisting of: polyethylenes, polyacrylates, polyacrylamides, polyvinyls, polyethers, siloxanes, urethanes, and combinations thereof.

9. The method of claim 1, wherein the deposition catalyst is a positively or negatively charged ion of a metal selected from the group consisting of: Pd, Pt, Ru, Ni, Co, Cu, Zn, Cr, Fe, Pb, Sn, Ag, Hg, Mn, and combinations thereof.

10. A method of electroless selective material deposition comprising:
    a) exposing a multi-material 3D structure to a deposition catalyst, wherein the deposition catalyst is positively charged or negatively charged, wherein the multi-material 3D structure is formed with at least two polymers selected from the group consisting of: a negatively charged polymer, a positively charged polymer, and a neutral polymer, so as to form at least two differentially charged regions of the multi-material 3D structure selected from the group of: a negatively charged region, a positively charged region, and a neutral region
wherein a positively charged deposition catalyst associates or attaches to negatively charged region(s), wherein a negatively charged deposition catalyst attaches to positively charged region(s), and wherein substantially no deposition catalyst attaches to neutral region(s) present in the 3D structure;
b) exposing the multi-material 3D structure from step a) to a first material to be deposited and allowing autocatalysis, attachment, and/or deposition of the first material on the 3D structure in regions where the deposition catalyst is present
c) washing the 3D structure after step b) to remove the deposition catalyst present after step c);
d) optionally repeating step a) wherein the charge of the deposition catalyst is opposite from that of the catalyst used in step b); and
e) optionally exposing the 3D structure from step d) to a second material to be deposited and allowing autocatalysis, attachment, and/or deposition of the second material on the 3D structure in regions where the deposition catalyst is present.

11. The method of claim 10, wherein the multi-material 3D structure is formed using a multi-material additive manufacturing process, wherein the multi-material additive manufacturing process is optionally a light-based multi-material additive manufacturing process.

12. The method of claim 10, wherein the multi-material 3D structure comprises micro-scale features.

13. The method of claim 10, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

14. The method of claim 13, wherein the negatively charged polymer comprises one or more ionic groups, where each of the one or more anionic groups can each be individually selected from the group consisting of: a sulfonate, a carboxylate, a carboxylic acid, a hydroxide containing group, a group containing a halogen ion, an epoxide group, a phosphate group, a phosphinite group, a phosphonite group, a phosphinate group, a phosphonate group, a phosphide group, a nitrate group, a sulfide group, a thiolate group, and combinations thereof.

15. The method of claim 10, wherein the positively charged polymer is selected from the group consisting of: positively charged polyacrylates, polyacrylamides, siloxanes, polyvinyls, polyamines, polyimines, polylysine, polymers having lysine functionalities, polyarginine, polymers having arginine functionalities, guanidine, polymers having guanidine functionalities, polymers having guanidinium functionalities, polymers having fully quaternized ammonium functionalities, cationic polymers that do not have primary or secondary ammonium functionalities, phosphonium, and combinations thereof.

16. The method of claim 15, wherein the positively charged polymer comprises one or more cationic groups, wherein each of the one or more cationic groups can be individually selected from the group consisting of: an amide, an amine, an imine, an imide, an azide group, phosphonium group, and combinations thereof.

17. The method of claim 10, wherein the neutral polymer is selected from the group consisting of: polyethylenes, polyacrylates, polyacrylamides, polyvinyls, polyethers, siloxanes, urethanes, and combinations thereof.

18. The method of claim 10, wherein the deposition catalyst is a positively or negatively charged ion of a metal selected from the group consisting of: Pd, Pt, Ru, Ni, Co, Cu, Zn, Cr, Fe, Pb, Sn, Ag, Hg, Mn, and combinations thereof.

19. The method of claim 10, further comprising the step of forming a multi-material three-dimensional (3D) structure, wherein the multi-material 3D structure is formed with at least two polymers selected from the group consisting of: a negatively charged polymer, a positively charged polymer, and a neutral polymer, so as to form at least two differentially charged regions of the multi-material 3D structure selected from the group of: a negatively charged region, a positively charged region, and a neutral region before step b).

20. A 3D structure produced by the method of claim 1.

* * * * *